United States Patent [19]
Bahns et al.

[11] Patent Number: 5,620,571
[45] Date of Patent: Apr. 15, 1997

[54] MULTIPLE SINGLE FREQUENCY LASER SYSTEM AND METHOD OF OPTICAL MANIPULATON OF MOLECULES

[75] Inventors: John T. Bahns, Storrs; William C. Stwalley, Mansfield Center; Phillip L. Gould, Coventry, all of Conn.

[73] Assignee: The University of Connecticut, Storrs, Conn.

[21] Appl. No.: 419,860

[22] Filed: Apr. 5, 1995

[51] Int. Cl.$^6$ .................................................. B01D 59/00
[52] U.S. Cl. ............................. 204/157.15; 204/157.22; 422/186
[58] Field of Search ..................... 204/157.41, 157.61, 204/157.22, 157.15; 422/186

[56] References Cited

U.S. PATENT DOCUMENTS

| | | | |
|---|---|---|---|
| 4,003,809 | 1/1977 | Lyon | 204/157.1 R |
| 4,039,411 | 8/1977 | Woodroffe et al. | 204/157.1 R |
| 4,110,182 | 8/1978 | Stevens | 204/151.1 R |
| 4,407,705 | 10/1983 | Garscadden et al. | 204/157.1 H |
| 4,432,225 | 2/1984 | Hayes et al. | 73/23.1 |
| 4,661,221 | 4/1987 | Robinson et al. | 204/157.22 |
| 4,851,262 | 7/1989 | McFeaters | 427/217 |
| 5,055,677 | 10/1991 | Amirav et al. | 250/282 |

OTHER PUBLICATIONS

Laser Cooling by Spontaneous Anti–Stokes Scattering, Jan. 26, 1981, The American Physical Society, vol. 46M, No. 4.
Laser Cooling of Gases by Reradiation at Higher Frequency Transitions, Sep. 1978, vol. 26, No. 3, Optics Communications.
Optically Pumped CW Dimer Lasers, 1979 IEEE Journal of Quantum Electronics, vol. QE–15, No. 10, Oct. 1979.
Optically Pumped Supersonic Beam Lasers: Basic Concept and Results, J. Opt., Soc. Am. B./vol. 6, No. 7, Jul. 1989.
Proceedings of the International Conference on Lasers '82, Bahns et al, University of Iowa (no date unavailable).
Optically Pumped Ring Laser Oscillation to Vibrational Levels Near Dissociation and to the Continuum in $NA_2$, Appl. Phys. Lett. 42, Feb. 15, 1983.
Laser–Cooling and Trapping Neutral Atoms, Ann. Phys. FR. Dec. 1985.
Laser Cooling and Trapping of Calcium and Strontium, Journal of Applied Physics, Nov. 1990.
62–DB–Gain Multiple–Pass Slab Geometry ND:YAG Amplifier Optical Society of America 1986—Kane et al, 1986.
Transversely Pumped 11–Pass Amplifier for Femtosecond Optical Pulses Oct. 1991 vol. 30, No. 30 Applied Optics.

*Primary Examiner*—Kathryn Gorgos
*Assistant Examiner*—Kishor Mayekar
*Attorney, Agent, or Firm*—Fishman, Dionne & Cantor

[57] ABSTRACT

A multiple single frequency laser for optical manipulation of molecules is presented. The multiple single frequency laser comprises generally a multiline laser source which utilizes one sample of molecular species as a source for the generation of optical radiation for manipulating (e.g., cooling) a second, separate sample of the same species of molecules. More specifically, the multiple single frequency (MSF) laser comprises a master controller for controlling the frequency of powerful single frequency pump lasers. Laser beams from the pump lasers excite coherent Raman transitions in molecules contained in a Raman gain cell. These beams are tuned to specific optical transitions in an electronic band of molecules. The molecules contained in the Raman gain cell generate the multiple frequencies needed to manipulate (e.g., cool) the same species of molecules in a second, separate sample. The Raman gain cell provides an output beam which is presented to a multistage optical amplifier for generating an amplified output beam. The amplified output beam is presented to a wavelength selector where unwanted frequencies are eliminated resulting in a MSF output beam. MSF output beam includes multiple laser frequencies all of which are synchronously controlled by controlling the frequency of the pump laser via the controller.

42 Claims, 21 Drawing Sheets

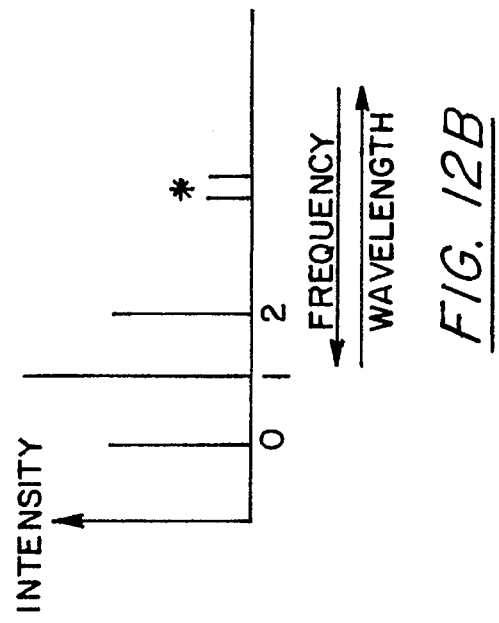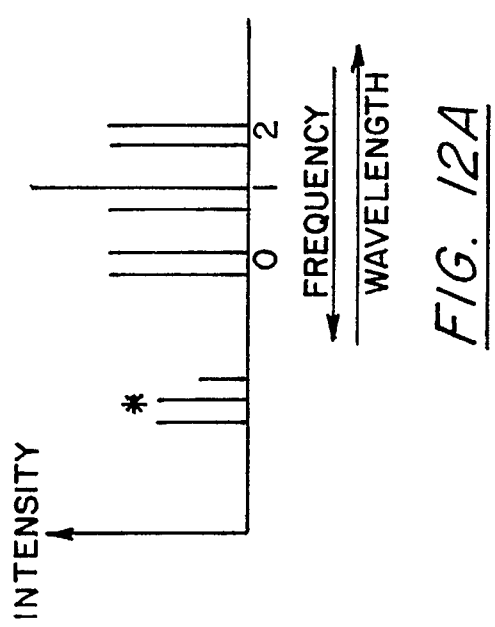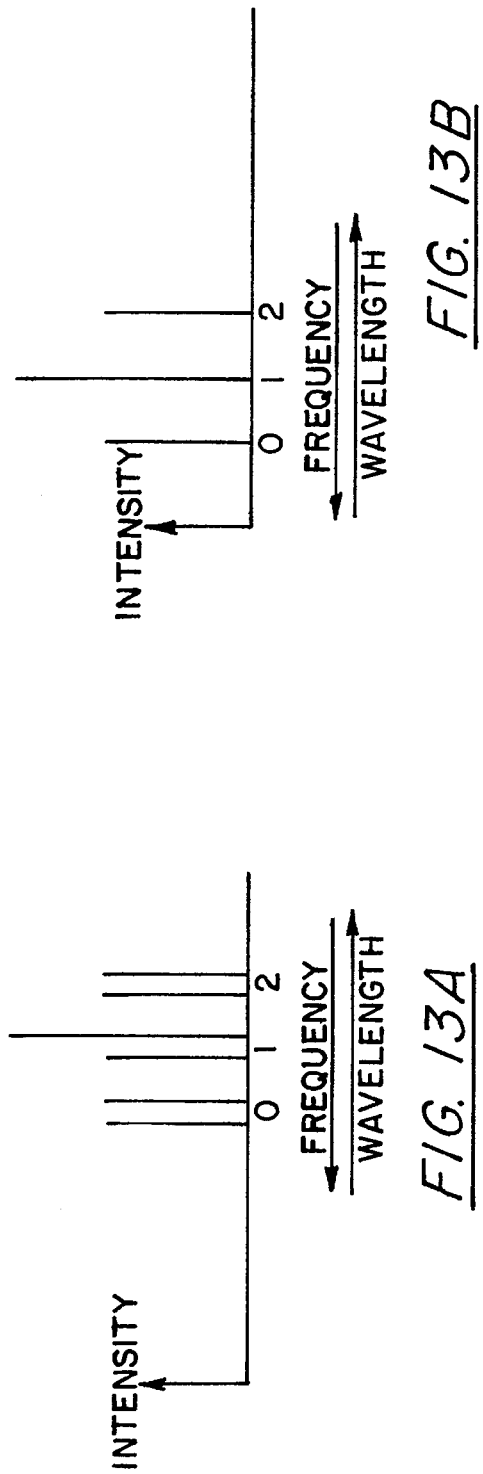

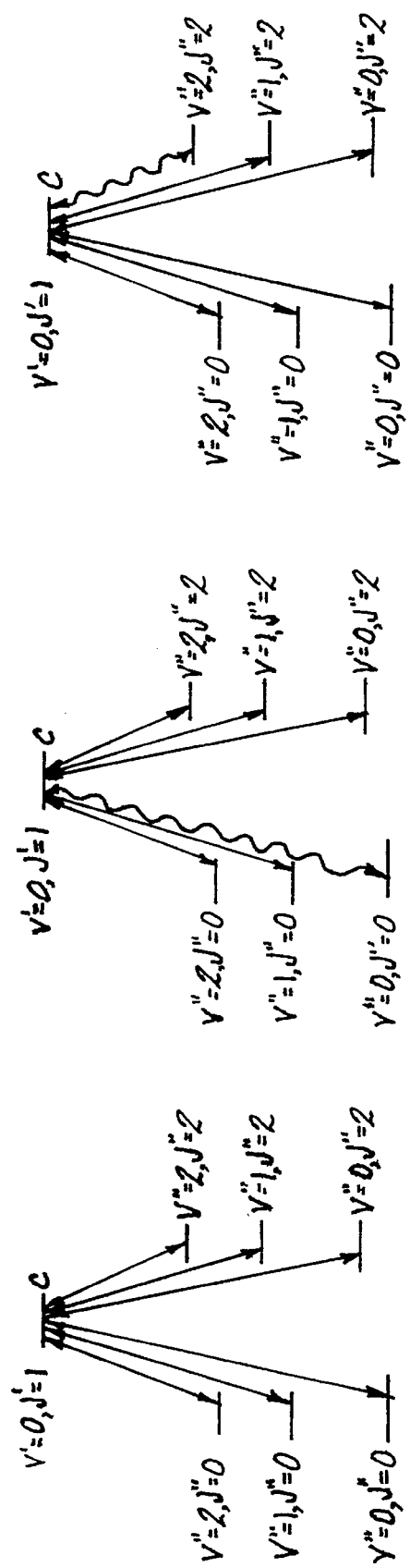

MULTIPLE SINGLE FREQUENCY LASER SYSTEM AND METHOD OF OPTICAL MANIPULATON OF MOLECULES

BACKGROUND OF THE INVENTION

The present invention relates to optical manipulation of molecules. More specifically, the present invention relates to a multiple single frequency laser and method of optical manipulation of multi-state-molecules, e.g., cooling or heating of molecules or atoms, and population transfer.

Atomic laser cooling is known and generally involves cooling external degrees of freedom (e.g., translation). However, cooling internal degrees of freedom (e.g., vibration, and rotation), as well as external, is also known, see, A. Kastler, J. Phys. Rad. 11, 255 (1950), wherein the concept of "lumino-refrigeration" is introduced. Laser cooling of internal degrees (i.e., molecules) is discussed in N. Djeu and W. T. Whitney, Phys. Rev. Lett. 46, 236 (1981), wherein significant cooling was measured of $CO_2$ molecules in a cell with radiation from a $CO_2$ laser.

Most laser cooling involves external degrees of freedom (i.e., translation), wherein the Doppler effect is typically employed. In general, Doppler cooling (see, W. D. Phillips, Ann. Phys. Fr. 10, 717 (1985)) is used to create a cooling cycle whereby a particle (i.e., an atom or molecule) is made to spontaneously radiate photons of greater energy than those it absorbs from a laser. The cooling cycle has just two steps: (1) absorption (FIG. 1) followed by (2) spontaneous emission (FIG. 2). In the first step (FIG. 1), a particle traveling with some velocity ($\hat{V}$) with respect to the laser wave vector ($\hat{k}_L$) absorbs a photon. The resonance condition for this absorption can be expressed as:

$$v_{Absorption} = v_{Laser} = v_E + \hat{k}_L \cdot \hat{V} = v_E + k_L V \cos\theta \tag{1}$$

Where $v_E$ is the "rest" velocity resonance frequency of the particle and $v_L$ and $k_L$ are the frequency and wave vector of the laser, respectively, and $\theta$ is the angle between $\hat{k}_L$ and $\hat{V}$. In the second step (FIG. 2), which occurs on the average one radiative life $\tau_{rad}$ after the first step, the particle radiates a photon at frequency $v_E$, which is the characteristic or resonance frequency. This is identical to the frequency of absorption the same particle would have if it had no velocity component parallel $\hat{k}_L$. The energy (and momenta) of the absorbed $v_A$ and radiated $v_E$ photons are different. The key to cooling is that the radiated frequency (and therefore energy) in each cycle be greater than that of absorption. The difference in energy in a given cycle may be written as:

$$\Delta E = h(v_L - v_E) \tag{2}$$

Where (h) is Planck's constant. After each cycle the particle velocity is reduced by an amount given by:

$$\Delta V = h \frac{v_E}{MC} \tag{3}$$

Where $v_E$ is the resonance frequency, M is the mass, and C is the speed of light. The resulting reduction in particle velocity in this cycle, means that the absorption frequency for the next cycle will occur at a higher frequency. The Doppler shift associated with $\Delta V$ is given by (see, W. D. Phillips, Ann. Phys. Fr. 10, 717 (1985)):

$$\Delta v = h \frac{v_E^2}{MC^2} \tag{4}$$

The particle changes its Doppler shift as it cools (i.e., $v_A$ and $v_L$ increase as the particle cools, however, $v_E$ does not change). Hence, to cool a particle from some initial velocity to zero, it is necessary to allow for this changing Doppler shift.

The acceleration a particle experiences as it cools is given by:

$$a = \frac{\hbar k_L}{2M\tau_{rad}} \tag{5}$$

Where $k_L$ is the wave vector of the laser and $\tau_{rad}$ is the spontaneous lifetime of the particle. The number of photons required to completely cool the particle is given by:

$$\#photons = \frac{V_o}{\Delta V} \tag{6}$$

Where the (most probable) initial velocity of the particle is given by:

$$V_o = \left[ \frac{2KT}{M} \right]^{1/2} \tag{7}$$

Where T is the translational temperature and K is the Boltzmann constant. The time required to Doppler cool a particle is determined by the rate limiting step in the cooling cycle, i.e., the spontaneous lifetime of the resonance ($\tau_{rad}$). Since most translational cooling is done with electronic transitions that have very short radiative lifetimes (generally, on the order of 10 nanoseconds), the time needed to cool a particle can be quite short (e.g., on the order of milliseconds). Consequently, the minimum distance needed to stop the particle is given by:

$$X_{min, cool} = \frac{V_o^2}{2a} \tag{8}$$

which can also be made quite small.

In the case of momentum exchange; because spontaneous emission can occur in any direction, after many cycles in succession the momenta of the radiated photons average an exceedingly small quantum limiting value resulting in a minimum temperature of the particle given by:

$$T_{min} = \frac{\hbar \Delta v}{2K} \tag{9}$$

Where $\Delta v$ is the radiative linewidth of the transition in angular frequency units. With narrow band lasers, the frequency difference between absorbed and emitted photons can be made small enough to realize this limit. As a result, the residual kinetic energy (and therefore the velocity) can be reduced to very small value (e.g., on the order of millimeters per second).

In vibrational cooling (FIG. 3), the molecule in vibrational level (v) first absorbs a photon from the cooling laser, transferring it to an excited electronic state (i.e., absorption). Next, the molecule radiates a photon of higher energy (i.e., emission). The two steps together result in the transfer of the molecule from a higher to a lower vibrational level (v−1). This process is referred to as vibrational electronic cooling. The energy change in vibrational cooling is given approximately by:

$$\Delta E \cong w_e \tag{10}$$

where $w_e$ is the vibrational constant (in energy units) of the vibrational mode (more precise formula uses the Dunham expansion, see, G. Herzberg, Spectra of Diatomic Molecules, Van Nostrand-Reinhold, New York (1950).

In rotational cooling (FIG. 4) the same scenario results, the cooling cycle consists of absorption of a photon from a laser out of a ground state level (J+1) to an excited electronic state. After approximately one radiative lifetime, the molecule radiates a photon of higher energy, transferring it to a lower (J−1) rotational level. The molecular internal energy is thus reduced by an amount given by:

$$\Delta E \cong 4B(J+\tfrac{1}{2}) \quad (11)$$

(see, G. Herzberg, Spectra of Diatomic Molecules, Van Nostrand-Reinhold, New York (1950)). This process is referred to as RE cooling. Subsequent cooling cycles to reduce rotation and vibration further require successively higher frequency (and energy) laser photons, until the lowest rotation and vibration states (J=0 and v=0) are reached. Formuli for these shifts may also be derived from the appropriate Dunham expansions, see, G. Herzberg, Spectra of Diatomic Molecules, Van Nostrand-Reinhold, New York (1950).

TABLE 1, below, shows that the degrees of freedom of a particle may be divided into external (i.e., translation) and internal (i.e., vibration, rotation and electronic). The cooling types that result depend on the type of optical transition that is used for the cooling cycle. Optical transitions are categorized herein as: electronic, vibrational, or rotational. Translational cooling can be performed on electronic, vibrational, or rotational transitions. In the case of internal degrees of freedom there are more possibilities. For vibrational cooling, electronic or vibrational transitions can be used. Rotational cooling can be performed on electronic, vibrational, and rotational transitions. Finally, for electronic degrees of freedom, just electronic transitions can be used.

TABLE 1

| Degree of Freedom | Optical Transition | Cooling Type |
|---|---|---|
| EXTERNAL: | | |
| Translation | Electronic | TE |
| | Vibration | TV |
| | Rotation | TR |
| INTERNAL: | | |
| Vibration | Electronic | VE |
| | Vibration | VV |
| Rotation | Electronic | RE |
| | Vibration | RV |
| | Rotation | RR |
| Electronic | Electronic | EE |

The rate of cooling in each of the above cases is proportional to the reciprocal of the spontaneous radiative lifetime of the optical transition (or Einstein A coefficient) multiplied by the average energy change in a given cycle. The radiative rates (proportional to the Einstein A coefficient) for optical transitions lie in the order:

Electronic>Vibrational>Rotational

Furthermore, the cooling cycle energy difference for each degree of freedom is generally in the order:

Electronic>Vibrational>Rotational>Translational

With these approximations, overall ordering of the rates of the cooling types becomes:

EE>VE>RE>TE>VV>RV>TV>RR>TR

Heretofore, only TE and RV cooling have been successfully realized experimentally. Cooling can also be achieved by converting translational degrees of freedom into rotational and vibrational using electronic transitions. This process is known as photoassociation and is well known in the art.

SUMMARY OF THE INVENTION

The above-discussed and other drawbacks and deficiencies of the prior art are overcome or alleviated by the multiple single frequency laser for optical manipulation of molecules of the present invention. In accordance with the present invention, the multiple single frequency laser comprises generally a multiline laser source which utilizes one sample of molecular species as a source for the generation of optical radiation for manipulating (e.g., cooling) a second, separate sample of the same species of molecules.

More specifically, the multiple single frequency (MSF) laser comprises a master controller for controlling the frequency of powerful single frequency pump lasers. Laser beams from the pump lasers excite coherent Raman transitions in molecules contained in a Raman gain cell. These beams are tuned to specific optical transitions in an electronic band of molecules. The molecules contained in the Raman gain cell generate the multiple frequencies needed to manipulate (e.g., cool) the same species of molecules in a second, separate sample. The Raman gain cell provides an output beam which is presented to a multistage optical amplifier for generating an amplified output beam. The amplified output beam is presented to a wavelength selector where unwanted frequencies are eliminated resulting in a MSF output beam. MSF output beam includes multiple laser frequencies all of which are synchronously controlled by controlling the frequency of the pump laser via the controller.

Cooling a hypothetical molecule on, for example, all nine (9) allowed transitions is accomplished with two synchronized pump lasers. One pump laser is used to excite the R,P branch, five (5) new frequencies are produced that are amplified to produce the MSF output beam for cooling the molecule on its six (6) R,P transitions. The second pump laser is used to excite the Q Branch, two (2) new frequencies are produced that are amplified to produce the MSF output beam for cooling the molecule on its three (3) Q transitions. The two pump lasers therefore yield all nine (9) molecule cooling laser frequencies needed to cool the molecule in all nine (9) possible rovibrational ground states. Further, either the R,P or the Q transitions may be used separately to cool the molecules.

However, with real molecules, there will nearly always be dark vibrational states. The presence of these "dark" vibrational states requires that an additional repump molecule cooling laser be employed to ensure closure of the R,P or Q cooling cycles. A repump laser accomplishes this by performing an unidirectional transfer of the molecular populations from "dark" to "light" vibrational states. One cooling laser and one repump laser are sufficient for the successful cooling of a molecular species.

Heretofore, laser cooling of molecules has not been practical, moreover, even with present laser cooling technology it is difficult to laser cool many atoms. It will be appreciated that the present invention applies to atomic as well as molecular laser cooling, whereby accurate predictions for a molecule cooling laser can be made. Further, atoms are vastly easier to cool because atoms do not possess vibrational or rotational states. This inherent simplicity means that a relatively small number of optically coupled states results, so that only a small number of laser frequencies are required for cooling. Laser cooling of simple atoms is described in e.g., S. Chu and C. Weiman, J. Opt. Soc. Am. B 6, 2109 (1989). Molecules, on the other hand, can vibrate and rotate and therefore have many more states (herein, vibrational and rotational states are referred to jointly as rovibrational states) than atoms, whereby more states require more laser frequencies for cooling. As a result, complex molecules have not been heretofore laser cooled, because the technical difficulty of synchronizing and manipulating many individual laser devices tends to increase rapidly with the number of lasers. In accordance with such prior art devices, a molecule cooling laser would require many tens or hundreds of individual laser frequencies, all of which must be maintained in well-defined resonance with each pair of optically coupled molecular rovibrational states while being fully synchronized with each other. This is not attainable with current technology devices. However, such is attainable with the present invention.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES:

FIGS. 10A and B are plots of the spectral outputs of the pump lasers in FIG. 8, wherein FIG. 10A is the output for pumping the R,P branch

FIGS. 11A and B are plots of the spectral outputs of the Raman gain cell in FIG. 8, wherein FIG. 11A is the output for the R,P branch

FIGS. 12A and B are plots of the spectral outputs of the amplifier in FIG. 8, wherein FIG. 12A is the output for the R,P branch and FIG. 12B is the output for the Q branch;

FIGS. 13A and B are plots of the spectral outputs of the MSF laser of FIG. 8, wherein FIG. 13A is the output for the R,P branch and FIG. 13B is the output for the Q branch;

FIGS. 15A and B are plots of the spectral outputs of the MSF laser of FIG. 8 for cooling translation only, wherein FIG. 15A is the output for the R,P branch

FIG. 25A is a diagram of energy levels for a molecule having six ground state rovibrational levels optically coupled to a common excited electronic state level;

FIG. 25B is a diagram of energy levels for the molecule of FIG. 25A with five saturated transitions and one dark state at the shortest wavelength, wherein all population is transferred to the cooled "dark" state, v"=0, J"=0;

FIG. 25C is a diagram of energy levels for the molecule of FIG. 25A with five saturated transitions and one "dark" state at the longest wavelength, wherein all population is transferred to the hot "dark" state, v"=2, J"=2;

DESCRIPTION OF THE PREFERRED EMBODIMENT

The present description is directed to laser cooling for purpose of example only, as other uses of the optical manipulation method of the present invention will be readily apparent to one of ordinary skill in the art, e.g., laser heating and population transfer. In general, the molecule cooling device of the present invention comprises a multiline laser source which utilizes one sample of molecular species as a source for the generation of optical radiation for cooling a second, separate sample of the same species of molecules.

Figure 1:
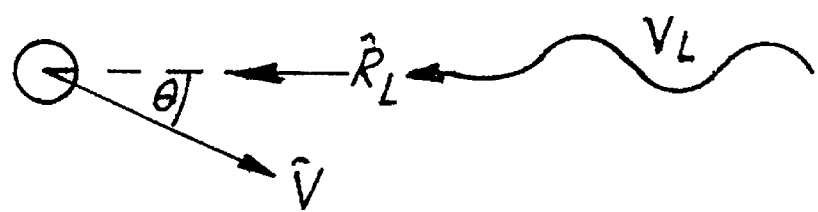
FIG. 1 is a diagrammatic view of a Doppler shift resonance condition for absorption.
Figure 2:
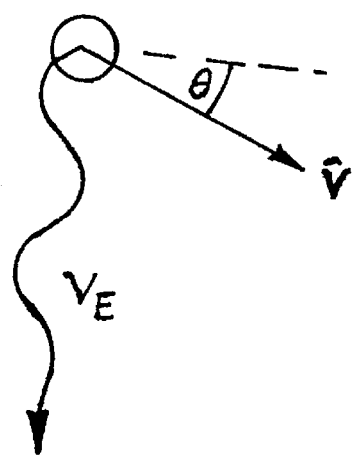
FIG. 2 is a diagrammatic view of the difference in particle kinetic energy from absorbing one laser photon and emitting one photon.
Figure 3:
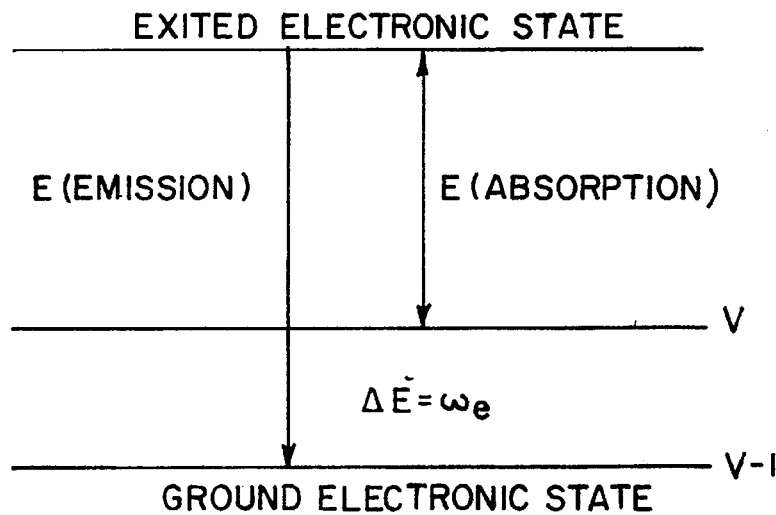
FIG. 3 is a schematic diagram of radiative mechanisms of vibrational cooling.
Figure 4:
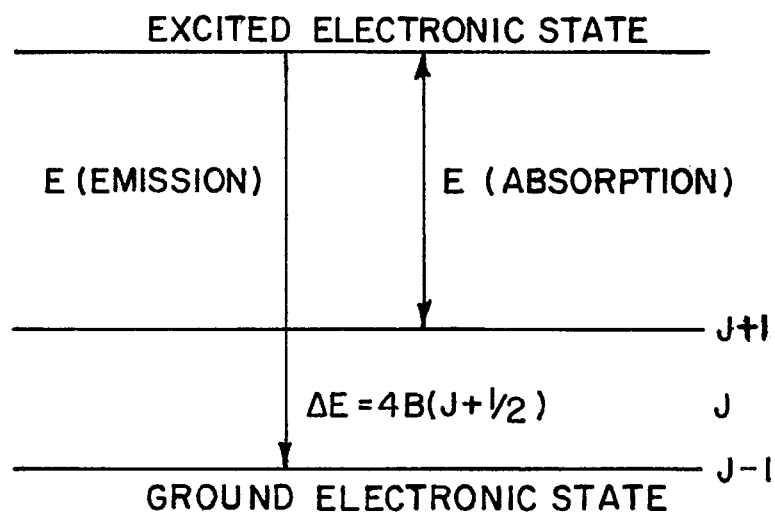
FIG. 4 is a schematic diagram of radiative mechanisms of rotational cooling.
Figure 5:
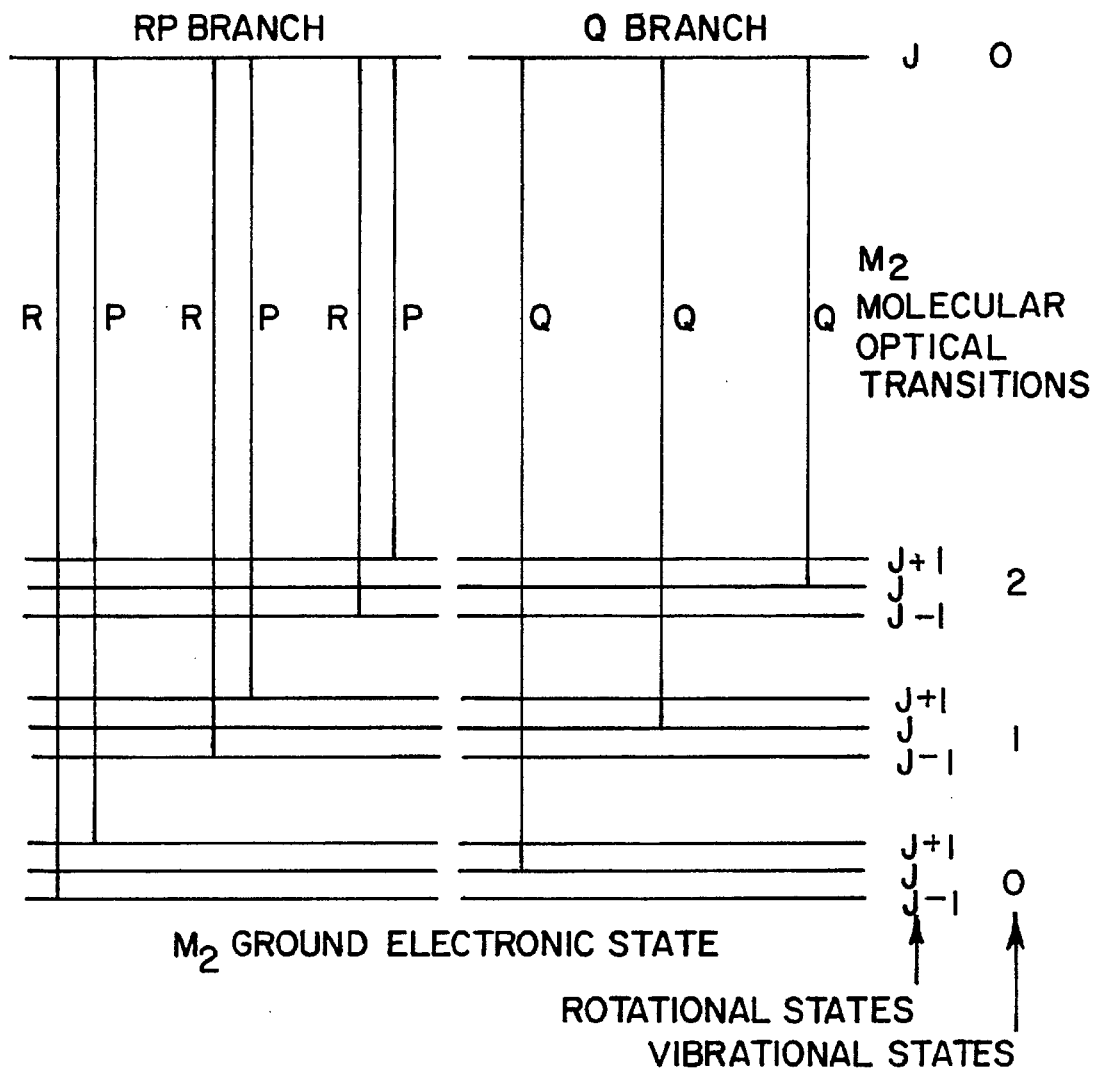
FIG. 5 is a diagram of energy levels for a molecule $M_2$ and allowed optical transitions for the R,P and Q branches.
Figure 6:
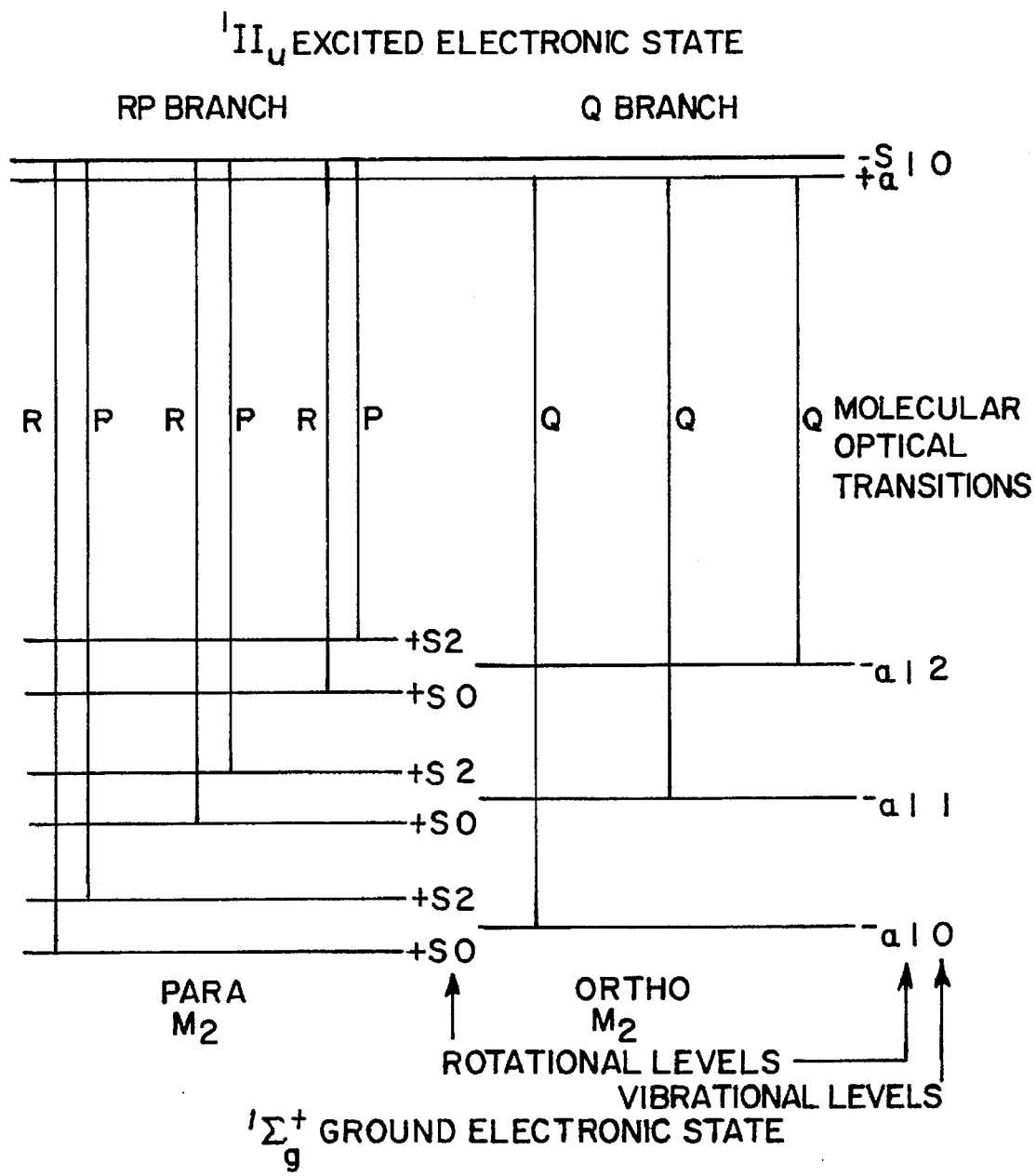
FIG. 6 is a diagram of energy levels for a molecule $M_2$ having nonzero nuclear spin for the case of excited $^1\Pi_u$ and ground $^1\Sigma_g^+$ electronic states.
Figure 7:
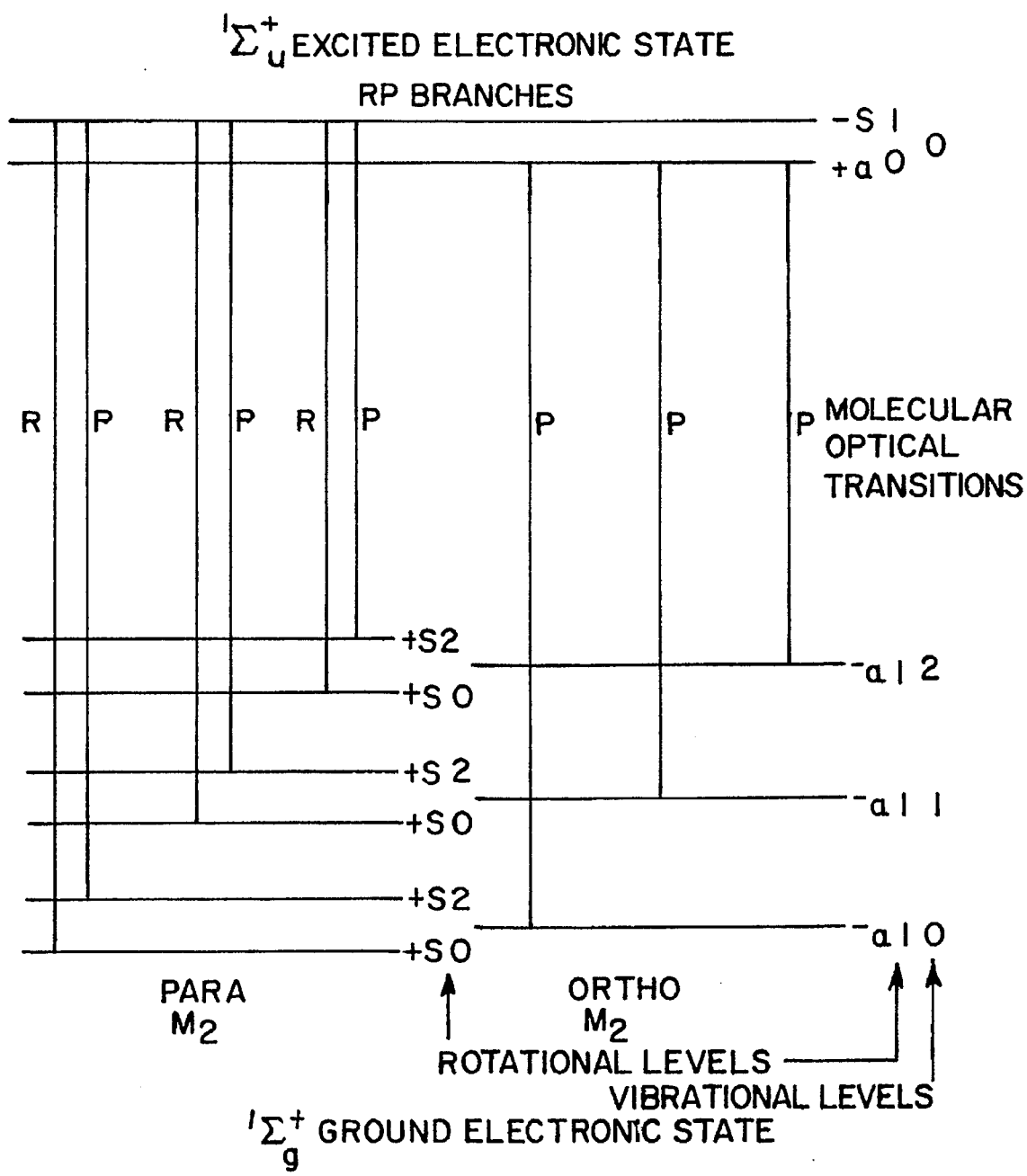
FIG. 7 is a diagram of energy levels for a molecule $M_2$ having nonzero nuclear spin for the case of excited $^1\Sigma_u^+$ and ground $^1\Sigma_g^+$ electronic states.

Referring to FIGS. 5–7, in the case of homonuclear diatomic molecules (with non integer nuclear spin), two distinctly different types of molecules result depending on whether their nuclear spins are aligned parallel (i.e., para molecules) or antiparallel (i.e., ortho molecules). The para molecules have only symmetric (labeled, "s") even numbered rotational levels (J=0,2 . . . ). Whereas, the ortho molecules have only antisymmetric (labeled, "a"), odd numbered rotational levels (J=1,3 . . . ). Although there is interconversion of one type of molecule to the other, it is exceedingly slow (e.g., on the order of weeks to months) compared to cooling times, which require milliseconds. FIGS. 5 and 6 show the simple molecule $M_2$ with the energy states of para molecules on the left and ortho molecules on the right. The selection rules for dipole allowed molecular optical transitions provide that J may change by +/−1 or 0 and that symmetric levels only undergo transitions to other symmetric levels, and likewise for antisymmetric rotational levels, see G. Herzberg, Spectra of Diatomic Molecules, Van Nostrand-Reinhold, New York (1950), which is incorporated herein by reference. For sigma-pi electronic transitions, para molecules undergo R,P transitions (see, the left half of FIG. 6) and ortho molecules only undergo Q transitions (see, the right half of FIG. 6). For sigma—sigma electronic transitions, para transitions are shown on the left half of FIG. 7 and ortho transitions are shown on the right half of FIG. 7. In this case only R,P transitions occur for both para and ortho molecules. No R branch occurs for ortho $M_2$ molecules in this case because the simple $M_2$ molecule used in the present example is defined as having only three rotational states; J=0,1, and 2, (there are no higher J states), such as is illustrated in TABLE 2 below. The direct result of the existence of para and ortho molecules is that separate pairs of cooling and repumping molecule cooling lasers are needed for para and ortho molecules.

TABLE 2

| Optical Transition | Molecule Type | Branch Type | Symmetry of the rotational states |
|---|---|---|---|
| $^1\Pi_u - ^1\Sigma_g^+$ | para | R, P | even, s |
|  | ortho | R, P | odd, a |
| $^1\Pi_u - ^1\Sigma_g^+$ | para | Q | even, s |
|  | ortho | Q | odd, a |
| $^1\Pi_u - ^1\Sigma_g^+$ | para | R, P | even, s |
|  | ortho | R, P | odd, a |

Referring again to FIG. 5, to further illustrate this problem of laser cooling molecules, the following simplified example of laser cooling a simple hypothetical molecule $M_2$ is provided, utilizing the Doppler technique, see generally, T. Hansch and A. Shawlow, Opt. Commun. 13, 68 (1975) or D. Wineland and H. Dehmelt, Bull. Am. Phys. Soc. 20, 637 (1975). $M_2$ is an especially simple diatomic molecule, see for example G. Herzberg, Spectra of Diatomic Molecules, Van Nostrand-Reinhold, New York (1950), such that the ground electronic state has just three (3) vibrational levels (labeled 0, 1 and 2) each of which contains three (3) rotational levels (labeled J−1, J and J+1). This molecule then has a total of 3×3, or 9 levels in the ground electronic state. Each of these nine (9) ground levels are optically coupled to a common upper state (v=0, J). Cooling this molecule then involves a total of nine (9) optical transition frequencies. Six transitions are of the R,P type and three are of the Q type. Transitions of the R,P type undergo a change in J of −1 or +1 in going from the excited to the ground electronic state, respectively. Transitions of the Q type however do not involve a change of J. Since one laser frequency is needed for each transition, to cool on every possible transition of this molecule, nine (9) individual laser frequencies are required. Again, each of these nine (9) individual laser frequencies must be continuously (i.e., temporally) maintained in well-defined resonance with each of the optically coupled states of the molecule while being precisely synchronized with each other. The present invention achieves this by synchronization of a single pair of pump lasers (rather than using nine (9) separate lasers, as would be required in the prior art). Synchronization of nine (9) separate lasers would be an exceedingly difficult or impossible task with present-day laser systems, whereby prior art laser molecule cooling technology does not exist that is capable of producing this many laser lines with this level of precision, accuracy, stability and control. It is an important feature of the present invention, that this technological barrier is overcome by using the molecules themselves as a means of generating and controlling (i.e., synchronizing) each of these nine (9) frequencies.

Figure 8:
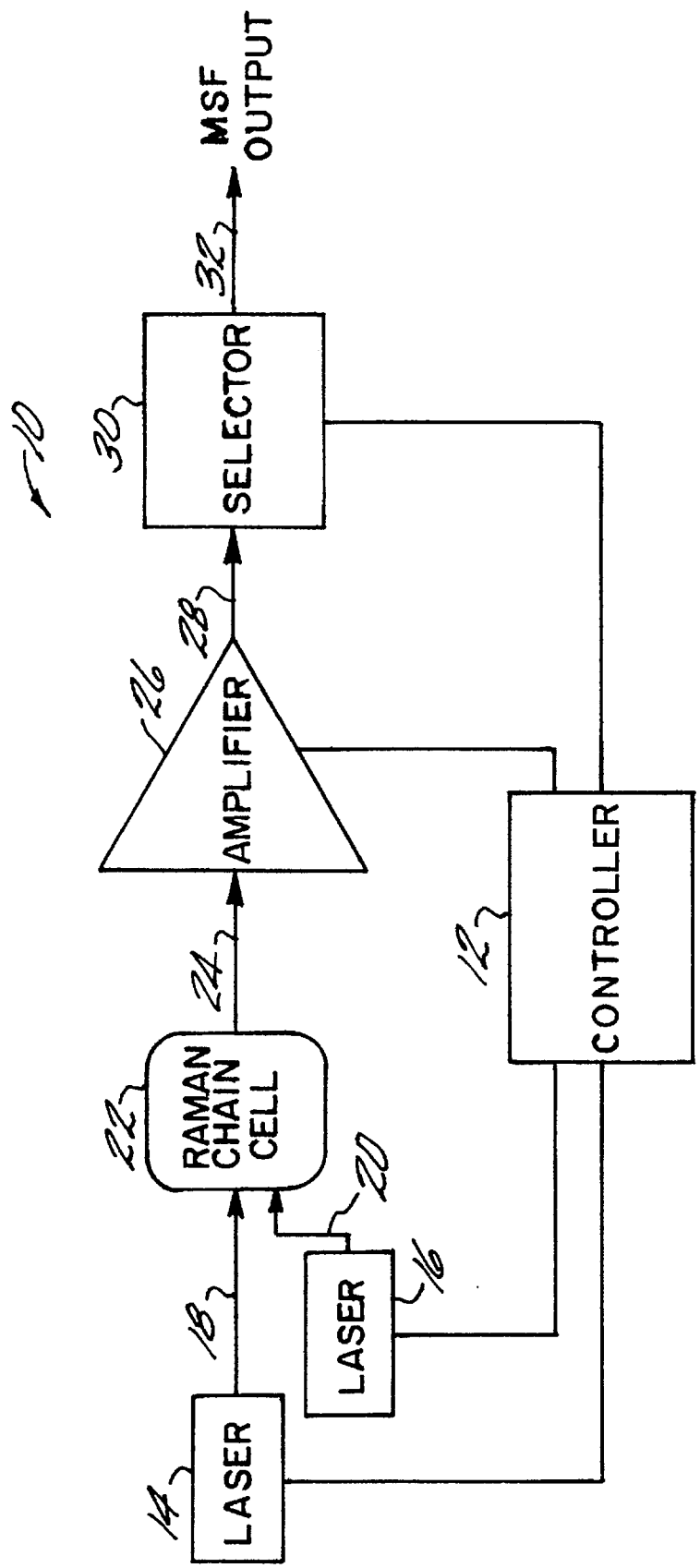
FIG. 8 is a schematic block diagram of a multiple single frequency laser in accordance with the present invention.

Referring to FIG. 8, a multiple single frequency (MSF) laser in accordance with the present invention is shown generally at 10. MSF laser 10 comprises a master controller 12 for controlling the frequency of powerful single frequency pump lasers 14 and 16, respectively. Laser beams 18 and 20 from lasers 14 and 16, respectively excite coherent Raman transitions in molecules contained in a Raman gain cell 22. In the present example, homonuclear molecule $M_2$ is considered, however the present invention also applies to other more complex molecules as well. Beams 18 and 20 are tuned to specific optical transitions in an electronic band of $M_2$. $M_2$ molecules contained in Raman gain cell 22 generate the multiple frequencies needed to cool $M_2$ molecules. Raman gain cell 22 provides output beam 24 which is presented to a multistage optical amplifier 26 for generating an amplified output beam 28. Amplified output beam 28 is presented to a wavelength selector 30 where unwanted frequencies are eliminated resulting in an output beam 32. Output beam 32 includes multiple laser frequencies all of which are synchronously controlled by controlling the frequency of the pump lasers via controller 12.

Figure 9:
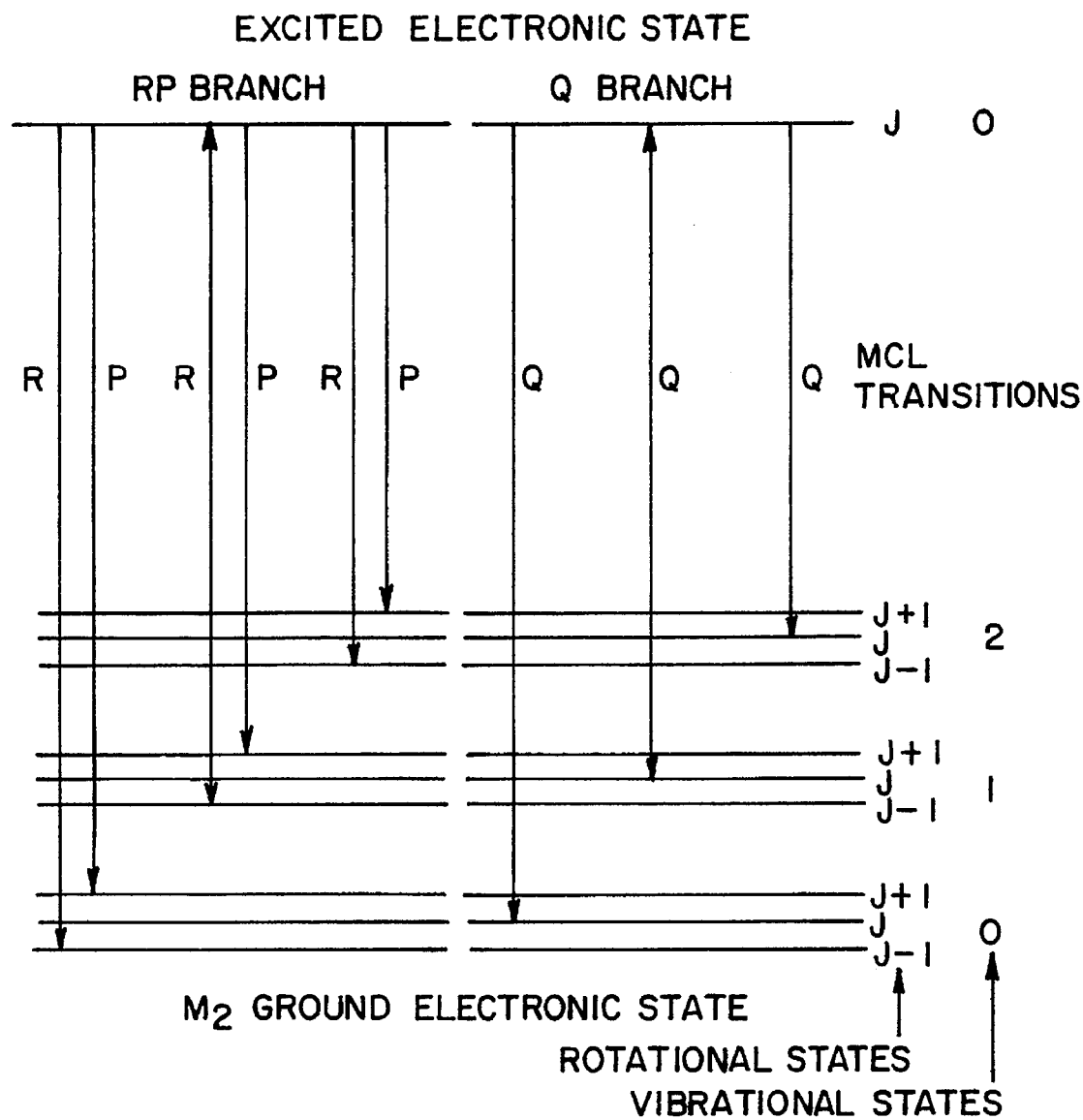
FIG. 9 is a diagram of energy levels for a molecule $M_2$ illustrating single frequency pump radiation for generating R,P and Q branch MSF frequencies.

Referring to FIG. 9, cooling $M_2$ molecules on all nine (9) allowed transitions is accomplished with two synchronized pump lasers (the synchronized pump laser outputs are illustrated by the double arrow lines). The single arrow lines represent stimulated Raman gain transitions that occur in the Raman gain cell 22. One pump laser is used to excite the R,P branch, five (5) new frequencies are produced that are amplified to produce output beam 32 for cooling $M_2$ on its six (6) R,P transitions. The second pump laser is used to excite the Q Branch, two (2) new frequencies are produced that are amplified to produce an output beam for cooling $M_2$ on its three (3) Q transitions. The two pump lasers therefore yield all nine (9) molecule cooling laser frequencies needed to cool $M_2$ molecules in all nine (9) possible rovibrational ground states. Further, either the R,P or the Q transitions may be used separately to cool $M_2$ molecules.

Figure 10A:
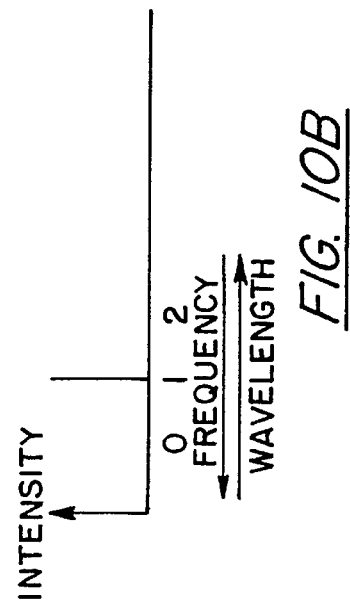
Figure 10B:
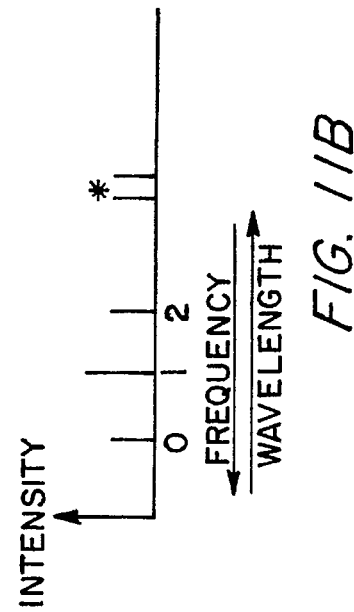
FIG. 10B is the output for pumping the Q branch.

Pump laser output 18 for the R,P pump laser only is shown generally at FIG. 10A. Pump laser output 20 for the Q pump laser only is shown generally at FIG. 10B. The resulting output of the Raman gain cell 22 is shown at FIG.

Figure 11A:
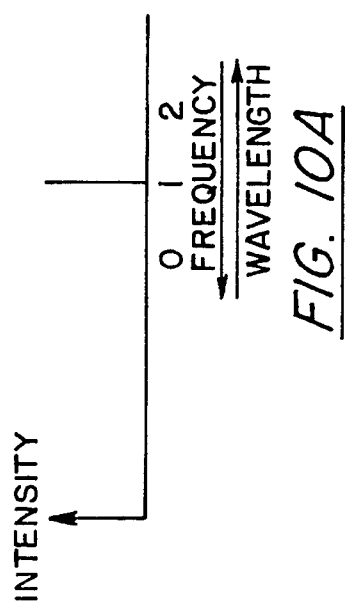
Figure 11B:
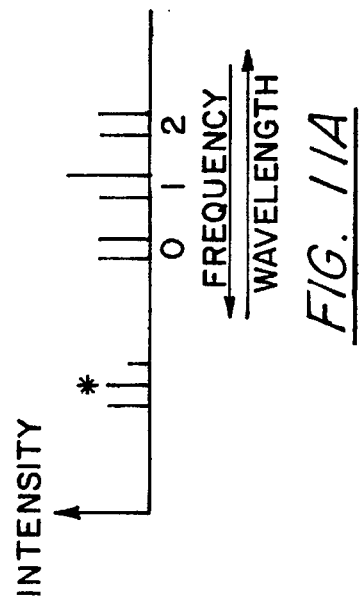
FIG. 11B is the output for the Q branch.
Figure 14:
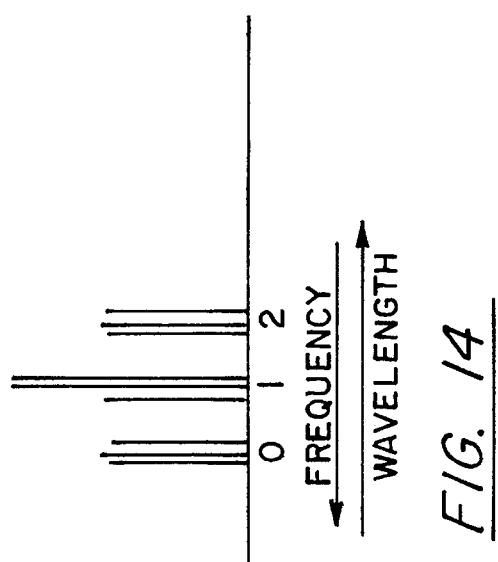
FIG. 14 is a plot of the combined (FIGS. 13A and B) spectral output of the MSF laser of FIG. 8 for both the R,P and Q branches.

11A for the R,P branch only and at FIG. 11B for the Q branch only. The frequencies marked with an asterisk in these FIGURES are not wanted. Amplified output 28 of multistage amplifier 26 is shown generally at FIG. 12A for the R,P branch only and at FIG. 12B for the Q branch only. The unwanted frequencies in output 28 are removed by wavelength selector 30 resulting in output 32 shown generally at FIG. 13A for the R,P branch only and at FIG. 13B for the Q branch only. FIG. 14 illustrates resulting output 32 when both pump lasers 14 and 16 are used, one for each the R,P and Q branches. By synchronizing these two pump lasers, the resultant MSF laser output 32 contains all nine (9) of the synchronously tunable frequencies needed to cool all nine (9) of $M_2$'s rotational and vibrational states.

Figure 15A:
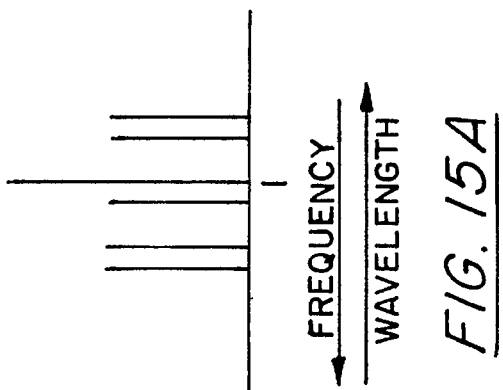
Figure 15B:
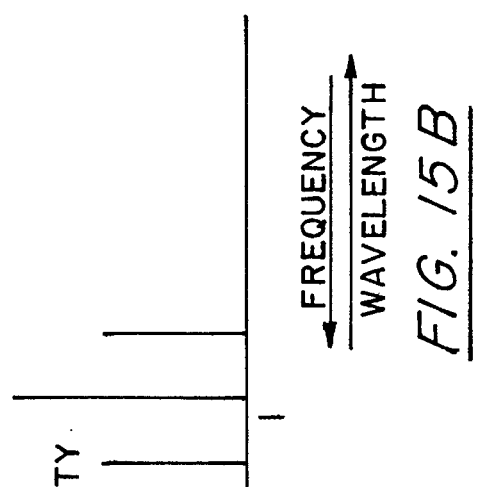
FIG. 15B is the output for the Q branch.
Figure 16:
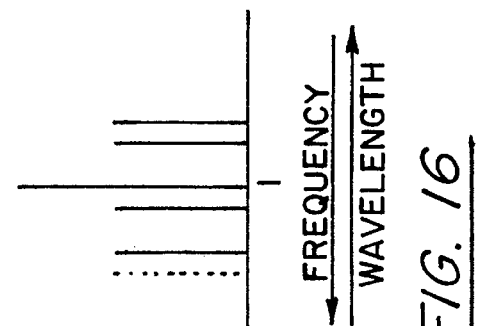
FIG. 16 is a plot of a spectral output of the MSF of FIG. 8 for cooling vibration and rotation.
Figure 17:
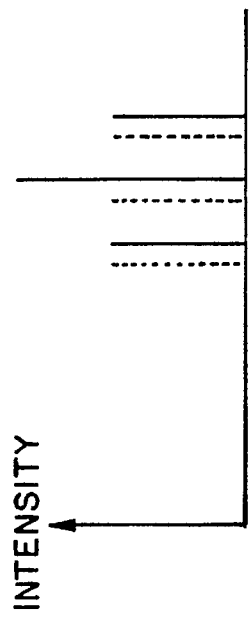
FIG. 17 is a plot of the spectral output of the MSF laser of FIG. 8 for cooling vibration, but not rotation.
Figure 18:
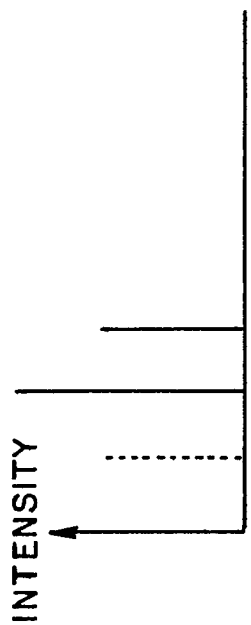
FIG. 18 is a plot of the spectral output of the MSF laser of FIG. 8 for cooling rotation, but not vibration.
Figure 19:
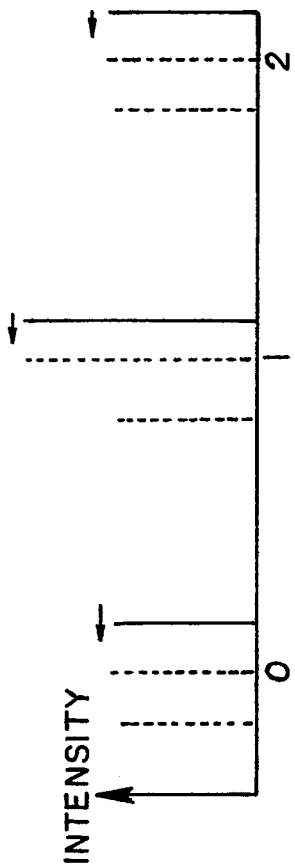
FIG. 19 is a plot of a spectral output of the MSF laser of FIG. 8 for heating vibration, but not rotation.
Figure 20:
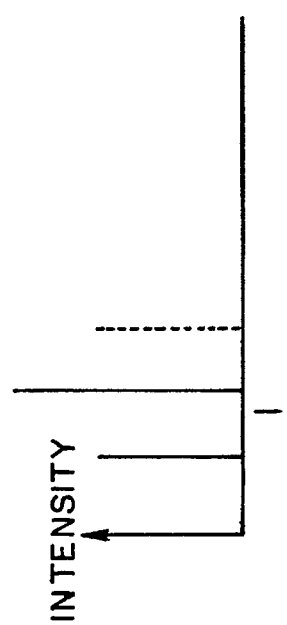
FIG. 20 is a plot of a spectral output of the MSF laser of FIG. 8 for P-chirp cooling, wherein all rotational levels are cooled, but not vibration or translation.

Multiple single frequency laser output 32 for the R,P branch is shown at FIG. 15A (which is the same as FIG. 13A) and for the Q branch is shown at FIG. 15B (which is the same as FIG. 13B). In the following example, translational cooling is not addressed, since it can be applied independently to all methods discussed below except for the P-chirp method. FIG. 16 shows one of the MSF transitions blocked (signified by a dashed vertical line) by wavelength selector 30 so that output 32 no longer has this laser line (i.e., R line of the v=0 transition). The resultant MSF beam 32 now will induce a simultaneous population transfer with cooling of vibration and rotation on $M_2$ molecules because the v=0, J−1 state (see, FIG. 9) is now effectively a "dark" state. Accordingly, all of the $M_2$ molecules in this R,P cooling cycle will be radiatively transferred into this v=0, J−1 state. Indeed, by blocking various output lines with wavelength selector 30 (or combinations of wavelengths) MSF device 10 can perform many other specific cooling mechanisms such as vibration only (see, FIGS. 17), and rotation only (see, FIG. 18). MSF laser output 32 for heating vibration but not rotation is shown at FIG. 19. Output 32 for another embodiment, referred to as the "P-chirp" method, is illustrated at FIG. 20. In the P-chirp cooling method pump laser 14 is scanned across the P branch of the molecule $M_2$ from high to low J. Wavelength selector 30 is set to remove all lines except the P branch MSF laser lines. The resultant output of MSF 10 will cool only rotation (not vibration or translation) in $M_2$ molecules. The result in this case is the rapid transfer of all $M_2$ molecules to their lowest rotational (J) level.

To produce an MSF laser beam for cooling different molecules, e.g., $R_2$ molecules, it would be necessary change the pump laser frequency and replace $M_2$ with $R_2$ molecules in Raman gain cell 22, with appropriate adjustments to amplifier 26 and wavelength selector 30.

It is not required to produce a molecule cooling laser frequency for every possible pair of optically connected states to be able to cool molecules. It is however necessary that a closed optical cooling cycle result. In other words, molecules in cooling or "light" states not leak, radiatively or otherwise, into noncooling or "dark" states. In the present example, either the six (6) R,P transitions or the three (3) Q transitions could be chosen as a closed cooling cycle. The light states are the nine (9) ground levels shown in FIG. 9. The $M_2$ molecules in the above example possessed no "dark" states; thus the R,P and Q branches formed completely closed cooling cycles. However, due to the difference between rotational and vibrational selection rules in molecular optical transitions, "dark" rotational states do not occur. Moreover, with real molecules, there will nearly always be "dark" vibrational states. The presence of these "dark" vibrational states requires that an additional repump laser to ensure closure of the R,P or Q cooling cycles. The repump laser does this by performing a unidirectional transfer of the molecular populations from "dark" to "light" vibrational states. Preferably, one cooling laser and one repump laser are employed for the successful cooling of a molecular species, as discussed more fully hereinbelow.

Automatic synchronous tuning of the MSF output frequencies 32 results from tuning only the single frequency pump lasers. This characteristic results primarily from Raman gain in the Raman gain cell 22. Basically, two kinds of gain are present: two-photon Raman gain and population inversion. The ratio of the two kinds of gain in the forward direction is given by:

$$\frac{\alpha \text{ (two photon Raman)}}{\alpha \text{ (population inversion)}} = \frac{\gamma_3 \frac{k_d}{k_p}}{\lceil g(1 - A_{32}/\gamma_2)} \quad (12)$$

where $A_{32}$ is the Einstein coefficient for spontaneous radiation, the $\gamma$'s are relaxation rates, the k's are wave vectors, and $\lceil g$ is given by, $$\lceil g = \gamma_{12} \frac{k_d}{k_p} + \left(1 - \frac{k_d}{k_p}\right) \gamma_{23} \quad (13)$$

Typically, for radiation in the forward direction, the two-photon Raman gain is the dominant mechanism, hence the name Raman gain cell (i.e., cell 22).

MSF laser output 32 is tuned by tuning only the pump laser. The tunable MSF laser output 32 in the forward direction given by:

$$\delta_d \text{ (Raman)} = \delta_p - k_p V \left(1 - \frac{k_d}{k_p}\right) \quad (14)$$

for the two-photon Raman process, and $$\delta_d \text{ (population inversion)} = \frac{k_d}{k_p} \delta_p \quad (15)$$

for the population inversion process. Where $\delta_p$ and $\delta_d$ are the pump and molecule cooling laser detunings from the respective central molecular resonance frequency, $k_p$ and $k_d$ are the respective wave vectors, and V is the molecule velocity.

Figure 21:
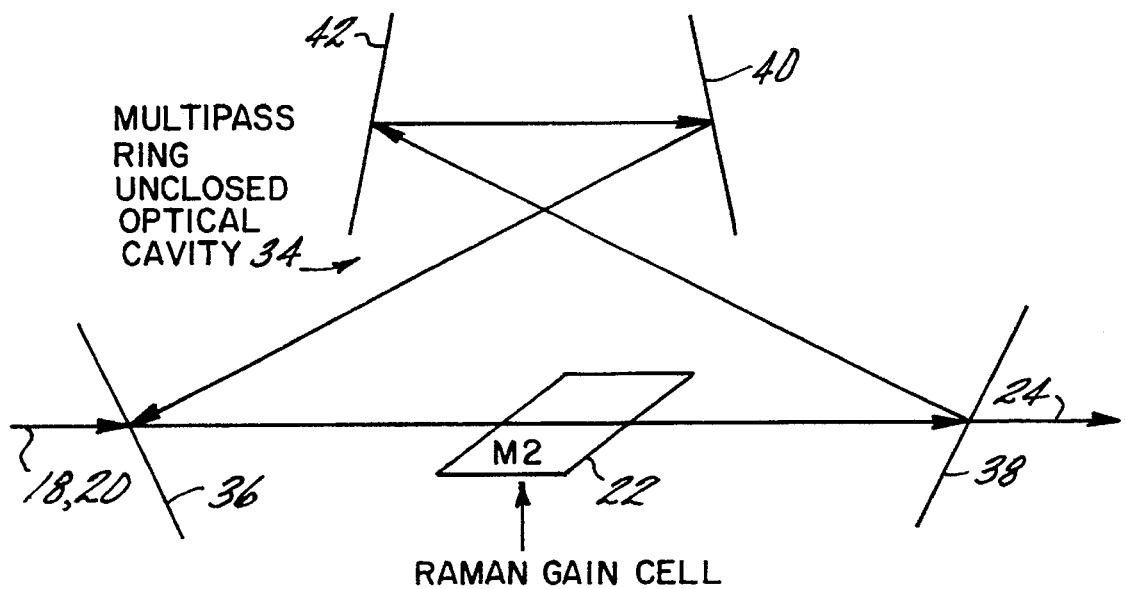
FIG. 21 is schematic diagram of an alternate embodiment of the Raman gain cell in FIG. 8.

The pump lasers and amplifiers can be operated in pulsed or CW (continuous wave) modes. Referring to FIG. 21, Raman gain cell 22 (could also be a molecular beam) can be made part of an unclosed optical ring resonator cavity 34, or optically pumped ring laser, as described in B. Wellegehausen, IEEE J. Quant. Elec. QE-15, 1108 (1979); B. Wellegehausen, K. H. Stephan, D. Friede, and H. Welling, Opt. Commun. 23, 157 (1977); J. B. Koffend and R. W. Field, J. Chem. Phys. 48, 4468 (1977); J. T. Bahns, PH.D. Thesis, University of Iowa, 1983; J. T. Bahns, K. K. Verma, A. R. Rajaei-Rizi, and W. C. Stwalley, Appl. Phys. Lett. 42, 336 (1983); U. Hefter, J. Eichert, and K. Bergman, Opt. Commun. 52, 330 (1985); P. L. Jones, U. Gaubatz, U. Hefter, K. Bergmann, and B. Wellegehausen, Appl. Phys. Lett. 42, 222 (1983); B. K. Clark, K. A. Page, and C. A. Stack, Chem. Phys. 163, 371 (1992); J. S. Ozcomert and P. L. Jones, Chem. Phys. Lett. 169, 1 (1990), all of the above are incorporated herein by reference. All or part of the multistage optical amplifier 26 could be incorporated in the ring cavity. More specifically, the laser beam passes through an optical element 36 and is presented to Raman gain cell 22. A portion of the output of Raman gain cell 22 passes through an optical element 38, while the remaining is reflected by element 38 and elements 40, 42 and 36 to the input of Raman gain cell 22. The above described assembly defining the unclosed multipass ring optical cavity 34.

Figure 22:
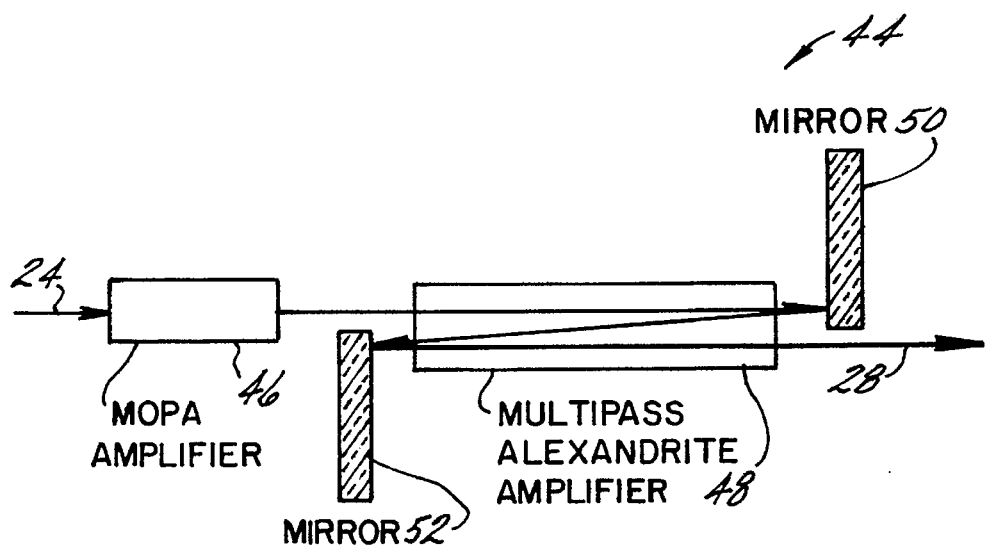
FIG. 22 is a schematic diagram of an alternate embodiment of the amplifier in FIG. 8.

Referring to FIG. 22, if not part of an optical cavity, either Raman gain cell 22 or amplifier 26 could be made part of an optical multipass system 44, such as the Herriott design, see D. Herriott, H. Kogelnik, and R. Kompfner, Appl. Opt. 3, 523 (1964); M. Lai, J.-C. Diels, and C. Yan, Appl. Opt. 30, 4365 (1991); W. H. Lowdermilk and J. E. Murray, J. Appl. Phys. 51, 2436 (1980), all of the above are incorporated herein by reference. More specifically, optical multipass system 44 comprises a master oscillator power amplifier (MOPA) 46 receptive to the beam from cell 22, see D. Mehuys, D. Welch and D. Scifres, Electr. Lett. 29, 1254 (1993); S. O'Brien, D. F. Welch, R. A. Parke, D. Mehuys, K. Dzurko, R. J. Lang, R. Waarts, and D. Scifres, IEEE J. Quant. Electr. QE-29, 2052 (1993), which are incorporated herein by reference. The output of amplifier 46 enters a multipass Alexandrite amplifier 48 with the output thereof being reflected back into amplifier 48 by a mirror 50. This reflected beam passes through amplifier 48 and exits the same where it is reflected back into amplifier 48 by a mirror 52. This twice amplified beam passes through amplifier 48 a third time resulting in the output beam 28. The number of passes in the Alexandrite amplifier can be twenty or more by using appropriate mirrors 50 and 52.

Figure 23A:
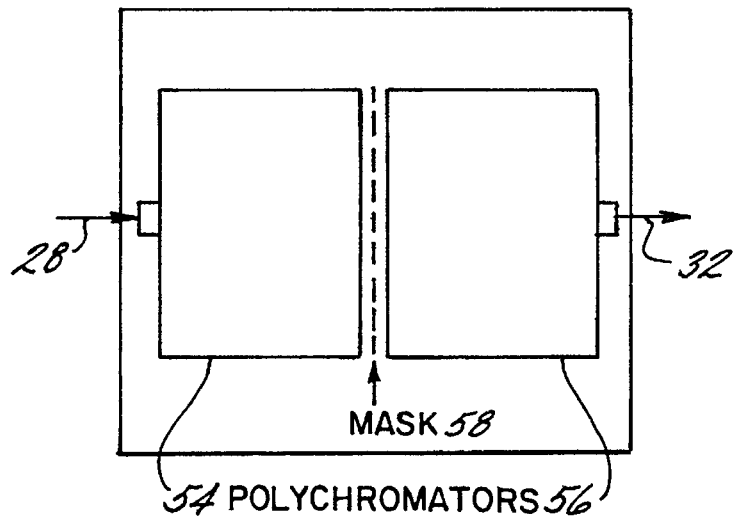
FIG. 23A is a schematic diagram of an alternate embodiment of the wavelength selector in FIG. 8.
Figure 23B:
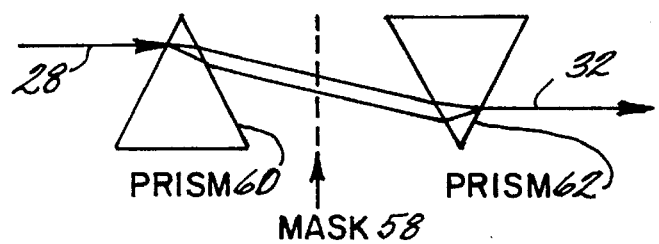
FIG. 23B is a schematic diagram of another alternate embodiment of the wavelength selector in FIG. 8.

Referring to FIGS. 23A and B, two alternate embodiments of wavelength selector 30 are shown. FIG. 23A shows two identical polychromators 54, 56 placed back-to-back. A mask 58, which can be a digital mask or spatial light modulator is placed between the polychromators 54, 56 as a means of eliminating unwanted frequencies. FIG. 23B shows a similar design utilizing two prisms 60, 62 with mask 58 therebetween. Further, wavelength selector 30 can also be operated by placing it between cell 22 and amplifier 26.

Again, molecules are generally difficult to laser cool due to the manner in which the molecular vibrational state populations transform in time when they undergo many optical transitions. Molecules or atoms can leak out of the radiatively connected states ("light" states, e.g., those that are being used to laser cool them) into "dark" states where there is no mechanism for their return to the cooling or light states, as described hereinbefore. The resultant leaking in these unclosed atomic cooling cycles, of the atomic or molecular population from "light" states into "dark" states has since been effectively handled in the prior art with an atom repump laser scheme. The present invention, also provides molecule repump laser scheme as described hereinbelow. Moreover, the repump MSF frequencies need not necessarily be synchronized to the cooling MSF frequencies for some types of cooling.

Figure 24A:
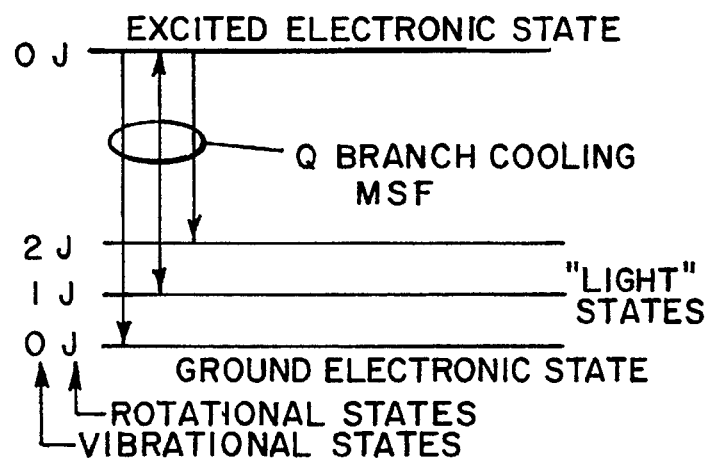
FIG. 24A is a diagram of energy levels for a molecule $M_2$ illustrating Q branch cooling.
Figure 24B:
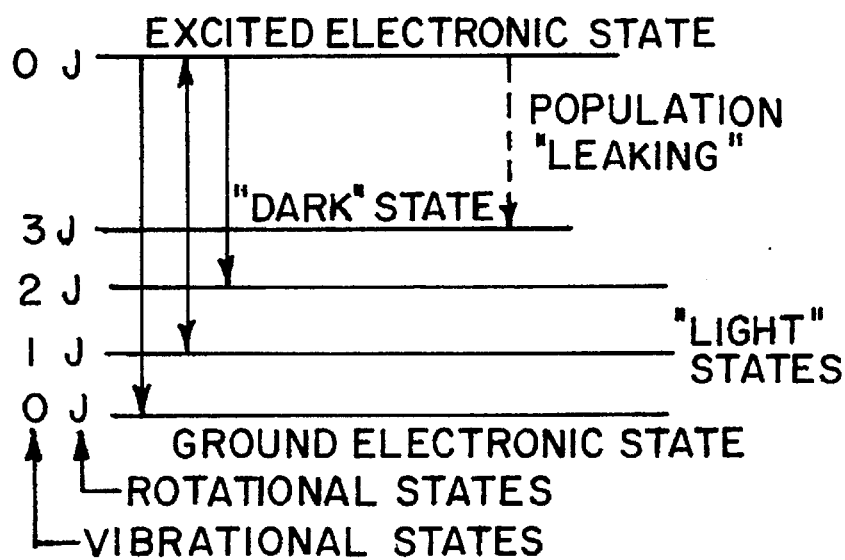
FIG. 24B is a diagram of energy levels for a molecule $M_2$ illustrating population leaking.
Figure 24C:
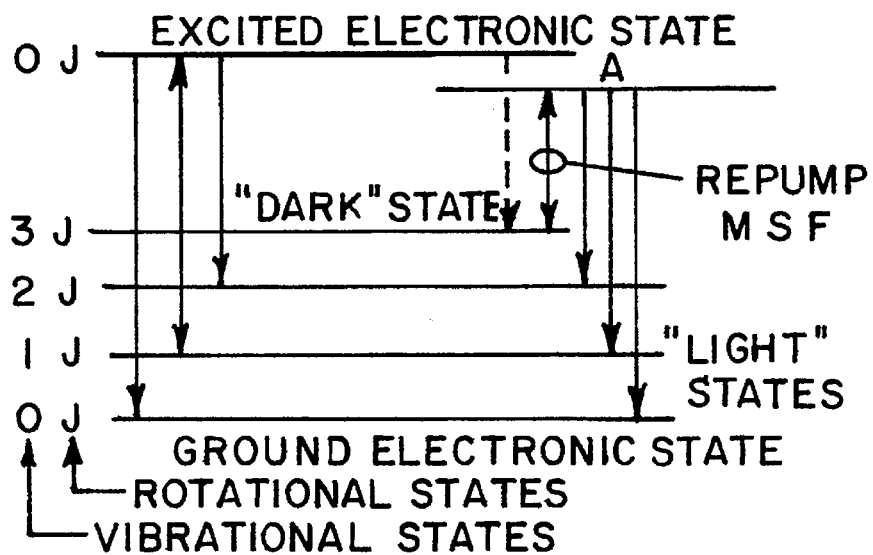
FIG. 24C is a diagram of energy levels for a molecule $M_2$ illustrating repumping.

FIG. 24A shows energy levels and cooling scheme for a Q branch MSF laser for $M_2$ (as shown at the Q branch of FIG. 5). In the present example, $M_2$ is modified to include an additional "dark" vibrational level (i.e, v=3,J), as shown in FIG. 24B, and an additional excited electronic state (i.e., A; v=0,J), as shown in FIG. 24C. While $M_2$ is being cooled by the Q branch, population is continuously leaking into the "dark" state (i.e., v=3,J), illustrated by the dashed arrow. If this leaking were allowed to continue, eventually all of the molecules would wind up in the "dark" state and $M_2$ would cease to be translationally cooled. However, as shown in FIG. 24C, a repump MSF laser empties the "dark" state by pumping $M_2$ molecules directly to a different excited electronic state (herein labeled "A"). Once in the "A" state, $M_2$ molecules then radiate, by fluorescence, which produces a unidirectional population transfer, to the "light" states, thus rapidly returning these molecules to "light" states. If the repumping rate is made to exceed the leaking rate, the population of "light" states is effectively prevented from leaking and the cooling cycle becomes closed.

Further, cooling or heating rates for internal degrees of freedom of molecules (i.e., vibration and rotation) are vastly greater than those for external degrees of freedom (i.e., translation).

The present invention is applicable to a wide range of molecules, atoms and ions including, but not limited to dimers (i.e., molecules composed of two atoms) of the alkalis, alkaline-earth-halides (and hydrides) and halogens (i.e., groups IA, IIA, and VIIA of the Periodic Table of the elements).

Variations of Doppler cooling may be employed, such as described with regard to cooling of atoms, e.g.: chirp cooling (W. Ertmer, R. Blatt, J. L. Hall, and M. Zhu, Phys Rev. Lett. 54, 996 (1985)), anisotropic light scattering (W. Ketterle, A. Martin, M. A. Joffe, and D. E. Pritchard, Phys. Rev. Lett. 69, 2483 (1992)), Zeeman cooling (W. D. Phillips and H. J. Metcalf, Phys Rev. Lett. 48, 596 (1982)), white light cooling (J. Hoffnagle, Opt. Lett. 13, 102 (1988); M. Zhu, C. W. Oates, and J. L. Hall, Phys. Rev. Lett. 67, 46 (1991); I. M. C. Littler, H.-M. Keller, U. Gaubatz, and K. Bergmann, Z. Phys. D 18, 307 (1991)), mode-locked cooling (P. Strohmeier, A. Horn, T. Kersebom, and J. Schmand, Z. Phys. D. 21, 215 (1991)), all of the above are incorporated herein by reference. It is an important feature of the present invention, that translation, rotation and vibration cooling can be conducted independently or simultaneously.

In accordance with another example of the present invention, cooling of $Cs_2$ (i.e., an alkali dimer) is presented.

Translational cooling (TE) with the Doppler technique requires many photon scattering events, whereby a closed cooling cycle is employed which limits the number of optically coupled vibrational states. TABLE 3 below lists the relevant parameters for TE cooling of molecular beams of the alkali dimers on the $B^1\Pi_u - X^1\Sigma_g^\pm$ band systems. As with atomic cooling, the number of photons is large, ranging from $2 \times 10^4$ to $1 \times 10^5$ for $Li_2$ through $Cs_2$, respectively. Cooling times, acceleration, distances, Doppler shifts, and chirp rates are also comparable to atomic cooling.

TABLE 3

| MOLECULE UNITS: | T@ 100 Torr K | V m/s | ΔV m/s ($10^{-2}$) | # photons ($10^4$) | t(rad)* n s | t(trans. cool) m s | a m/s² ($10^6$) | X min m | v Doppler shift Ghz | TE Chirp Rate Ghz/ms |
|---|---|---|---|---|---|---|---|---|---|---|
| $^7Li_2$ | 1350 | 1270 | 5.8 | 2.2 | 7.8 | 0.70 | 3.8 | 0.21 | 6.1 | 8.7 |
| $^{23}Na_2$ | 980 | 600 | 1.8 | 3.3 | 6.8 | 0.90 | 1.3 | 0.14 | 2.9 | 3.2 |
| $^{39}K_2$ | 860 | 430 | 0.78 | 5.5 | 9.7 | 2.1 | 0.4 | 0.23 | 1.5 | 0.71 |
| $^{85}Rb_2$ | 800 | 280 | 0.35 | 8.0 | 16.6 | 5.3 | 0.1 | 0.39 | 1.0 | 0.18 |
| $^{133}Cs_2$ | 760 | 220 | 0.20 | 11.0 | 25.0 | 11.0 | 0.04 | 0.61 | 0.67 | 0.06 |

It will be noted, that only allowed electronic transitions have a short enough radiative lifetime for practical translational cooling.

In order to limit the number of cooling frequencies required to form a nearly closed cooling cycle, wherein a nearly closed cycle is a lossy cooling cycle, one that loses a significant fraction of its initial population during the time needed for complete cooling, and to limit the range of v" to a minimum, the lowest accessible vibrational level of the B state is pumped. TABLE 4 below lists the wavelength ranges and v" ranges that result if v'=0 and $10^{-4}$ is the cut-off Franck Condon Factor (normalized to the largest, FCF) for the A–X and B–X bands of the alkali dimers. It will be appreciated, that for $Cs_2$ B–X bands, wavelengths range from 766–790 nm and involve v"=0–9. Optical transitions between v'=0 and these ten vibrational levels constitutes a nearly closed cooling cycle.

TABLE 4

| MOLECULE | A - X BANDS | B - X BANDS |
|---|---|---|
| $^7Li_2$ | 713–997 | 490–559 |
|  | 0–12 | 0–7 |
| $^{23}Na_2$ | 682–818 | 492–539 |
|  | 0–16 | 0–11 |
| $^{39}K_2$ | 857–994 | 650–693 |
|  | 0–18 | 0–9 |
| $^{85}Rb_2$ | 927–1022 | 681–715 |
|  | 0–17 | 0–12 |
| $^{133}Cs_2$ | 1039–1170 | 766–790 |
|  | 0–28 | 0–9 |

The number of photons needed, cooling time, and distance are related to the quantum efficiency, see TABLE 5 below. It will be noted, that for $Li_2$ the minimum efficiency of VE cooling is nearly four orders of magnitude larger than RE, and eight orders of magnitude larger than TE.

TABLE 5

| Molecule Units: | $V_{00}$ $cm^{-1}$ | $B_e$ $cm^{-1}$ | $\omega_e$ $cm^{-1}$ | $\epsilon$(TE) $10^{-12}$ | $\epsilon$(RE) $10^{-6}$ | $\epsilon_{min}$ (VE) $10^{-2}$ | $\epsilon_{max}$ (VE) |
|---|---|---|---|---|---|---|---|
| $^7Li_2$ | 20,400 | 0.673 | 351 | 100.0 | 66.0 | 1.70 | 0.114 |
| $^{23}Na_2$ | 20,300 | 0.155 | 159 | 30.0 | 15.0 | 0.78 | 0.082 |
| $^{39}K_2$ | 15,370 | 0.057 | 92 | 13.0 | 7.4 | 0.60 | 0.052 |
| $^{85}Rb_2$ | 14,660 | (0.026) | 57 | 6.0 | 3.5 | 0.40 | 0.046 |
| $^{133}Cs_2$ | 13,040 | 0.013 | 42 | 3.4 | 2.0 | 0.30 | 0.030 | where, $$\epsilon(TE) = \frac{M\Delta V^2}{2h\nu_{00}} \quad \epsilon(RE) = \frac{2B}{h\nu_{00}} \quad \Delta V = \frac{h\nu_{00}}{MC} \quad (16)$$

$$\epsilon_{min}(VE) = \frac{\omega_e}{h\nu_{00}} \quad \epsilon_{max}(VE) = \frac{G(v"_{max}) - G(o)}{h\nu_{00}}$$

By way of an example of VE cooling, FIG. 25 shows a fictitious molecule with six (6) ground state (P(2),R(0) transitions) rovibrational levels optically coupled to a common excited electronic state level v'=0,J'=1, in a closed cycle. Molecules move radiatively between states, continuously. FIG. 25B shows that if one frequency of the MSF laser is blocked, e.g., the one connecting v"=0,J"=0, it becomes a "dark" state and unidirectional fluorescence acts to rapidly transfer population to that state, while emptying population from the other five (5) ground states. Rapidly, all the molecules end up in the cold "dark" state; v"=0,J"=0. On the other hand, FIG. 25C shows that if the MSF laser frequency connecting v"=2, J"=2 is blocked, population is transferred, in a heating mechanism, to the "hot" dark state; v"=2,J"=2.

Real molecules have "dark" levels outside the strongly optically coupled levels (e.g., v"≧3 in the FIGS. 25A–C). These results from the nonrigid nature of vibrational selection rules (FCF's). In accordance with the present example, repumping is used to obtain a sufficiently closed cooling cycle for TE cooling of alkali dimers. Repumping is used to empty "dark" states by unidirectional transfer via a different excited state that spontaneously radiates preferentially to levels within the cooling cycle.

Figure 26A:
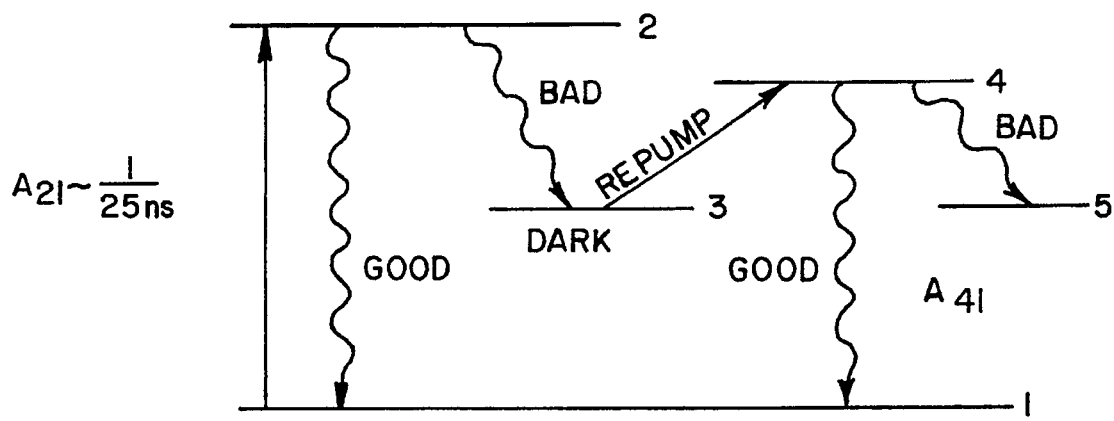
FIG. 26A is a diagram of energy levels for a molecule illustrating repumping.
Figure 26B:
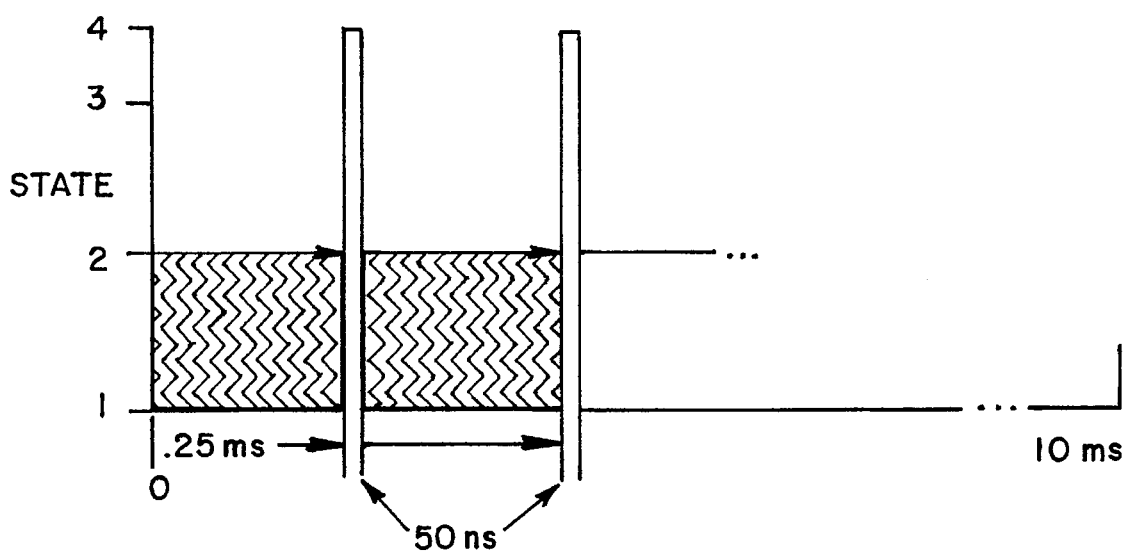
FIG. 26B is a plot of state versus time for repumping.

Referring to FIGS. 26A and B, repumping in a molecular system is shown. By way of example, a dark state (e.g., level 3) exists with a transition rate of $10^{-4} \times A_{21}$ outside a two-level cooling cycle with $A_{21}=4\times10^7$ $s^{-1}$. A given molecule will undergo an undesirable (i.e., bad) transition to the dark state once every $10^4 \times 25$ ns=0.25 ms. If $10^5$ photons are required to TE cool a two level molecule, the total time required to cool is about 10 milliseconds (ms). Without repumping this unclosed two-level cooling cycle, the number of molecules remaining in the cooling cycle after 10 ms is:

$$N(t=10 \, ms) = N_o e^{-10/0.25} = N_o e^{-40}, \quad (17)$$

which is essentially zero. Hence, a given molecule would remain in the cooling cycle for about 0.25 ms. Now, if a repump laser is added that rapidly transfers molecules from level 3 to a different state (e.g., level 4) that radiates preferentially to level 1 ($A_{41}$=0.5 $A_{21}$), molecules are rapidly (e.g., within about 50 ns) returned (unidirectionally) to state 1 of the cooling cycle, and are ready for another 0.25 ms of cooling before the next undesired transition. A given molecule will enter the "dark" state roughly forty times in 10 ms. If an additional "dark" state (e.g., level 5) exists, the probability of molecules leaking to level 5 in 10 ms is $40 \times 10^{-3}$. Accordingly, about 4% of the molecules are lost to "dark" state (level 5), while 96% remained in the four-level, states 1, 2, 3 and 4, closed cooling cycle for the required 10 milliseconds and therefore become TE cooled. It will be appreciated, that if the transition probability to dark state (i.e., level 3) can be reduced by one order of magnitude, to $10^{-5} \times A_{21}$, the two-level cooling cycle would be effectively closed and no repump MSF laser frequencies would be required.

Associated with each v" of a molecular cooling cycle, is a thermally populated rotational band. The task in rotational cooling is to transfer the entire thermal population of molecules in the cooling cycle to just two rotational levels: J"=0 and 1 for para and ortho homonuclear (I=3/2) diatomic molecules. This is accomplished by tuning either continuously or in discrete steps the MSF pump laser (and not necessarily the repump laser) through the rotational branches (RP, and Q) of the cooling cycle.

Figure 27:
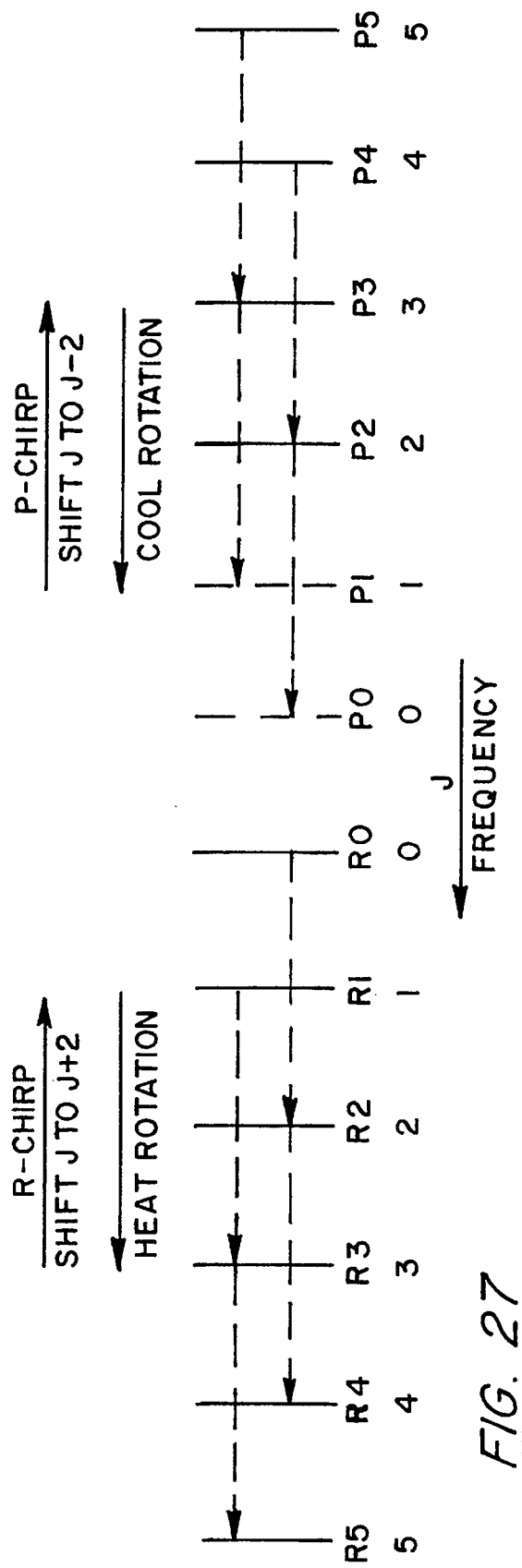
FIG. 27 is a frequency plot illustrating P and R chirp methods for cooling rotation.

Referring to FIG. 27, cooling using the P-Chirp method is shown at the right of the FIGURE for a typical P branch for low J. The P-chirp begins with the MSF laser tuned to the P5 line (J'5) on each B–X (0–v"$_{max}$) band, which causes rotational population to be transferred (shown by a dashed arrow) to J"=3(0–v"$_{max}$). In cesium, this transfer is complete in about 250 ns. Next, moving the MSF to higher frequency (i.e., positive dω/dt) and stopping on the P4 (J"=4) line transfers population to J"=2. This tuning is continued until the MSF laser reaches the P2 line where the P-Chirp ends. All rotational population within the maximum J range of the chirp (in this case 5) is transferred to the two lowest rotational levels J=0 and 1. A reverse P-Chirp (i.e., negative dω/dt) of the MSF laser from low to high J does not transfer population in the same way, but acts rather to shift the populations of rotational levels scanned through from J to J–2. Hence, repetitively sweeping (i.e., positive dω/dt) the frequency in a P-Chirp acts to optically pump population from high J to low J (0–v"$_{max}$).

The left side of FIG. 27 shows the situation for rotational heating using an R-Chirp. For example, an R-Chirp from the R0 to the R3 line transfers population from J"=0–3 into J"=4 & 5. Reversing the sweep (i.e., negative dω/dt), results in a shift of population from J to J+2.

For real molecules, at sufficiently large J, spectral overlap of R and P branches is common (see Fortrat diagrams, G. Herzberg, Spectra of Diatomic Molecules, Van Nostrand-Reinhold, New York (1950)). However this is not believed to pose a problem because such frequency overlaps involve different J and a supersonic molecular beam contains only rotationally cold molecules.

P and R-Chirps can also be tailored to cool/heat ortho molecules independently of para by using a discrete, rather than continuous dω/dt.

Figure 28:
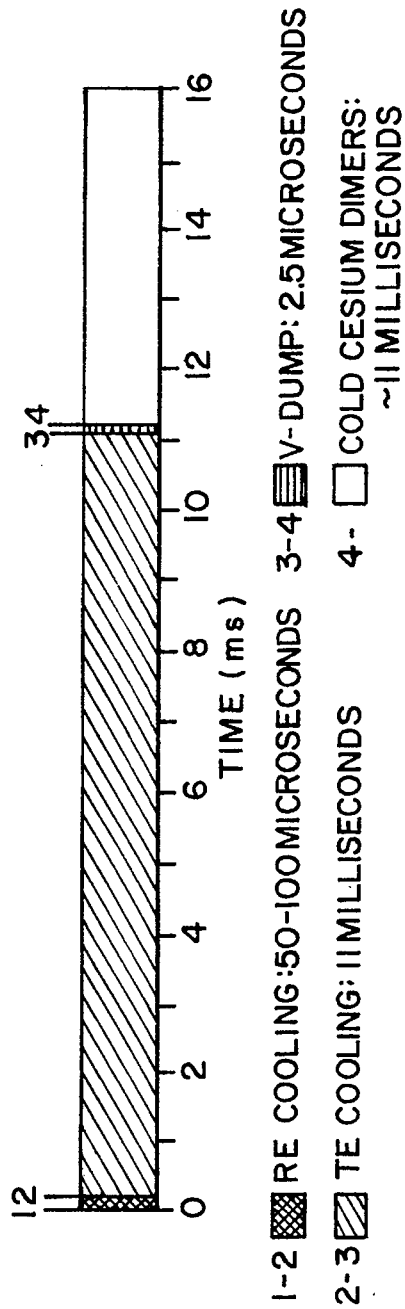
FIG. 28 is a time plot for combined RE, TE and VE cooling at Cesium dimers ($Cs_2$ on the B–X bands)

For the combined TE, VE, and RE cooling of molecules, order is important. Referring to FIG. 28 the appropriate MSF laser time-line for $Cs_2$ cooling on the B–X band system is shown. First, RE cooling is performed with a P-Chirp (e.g., from P10 to P2) lasting roughly 100 microseconds that transfers population from J"=2–10 into J"=0 & 1. Next, TE cooling is performed with a subDoppler chirp of the MSF laser lasting about 11 milliseconds. During this time, only R(0) and P(2) transitions are excited by the MSF laser, selecting only para molecules. It will be appreciated, that ortho molecules, RE cooled into J'=1, are not TE cooled in this example and are therefore allowed to escape. At the end of the TE cooling chirp, the captured molecules are all para, are in J"=0 and 2 (0–v"$_{max}$) and possess negligible kinetic energy. Lastly, VE cooling is invoked by blocking transitions of the MSF laser coupled to the v"=0 level, causing the entire vibrational population to be transferred to v"=0. For cesium, this transfer is complete in about 2.5 microseconds. A final, 250 ns, burst of P(2) MSF radiation then transfers all the population from J=2 to J–0. Hence after approximately 12 milliseconds, a cold gas of para $Cs_2$ (V=0, v"=0, J"=0) can be obtained.

Figure 29:
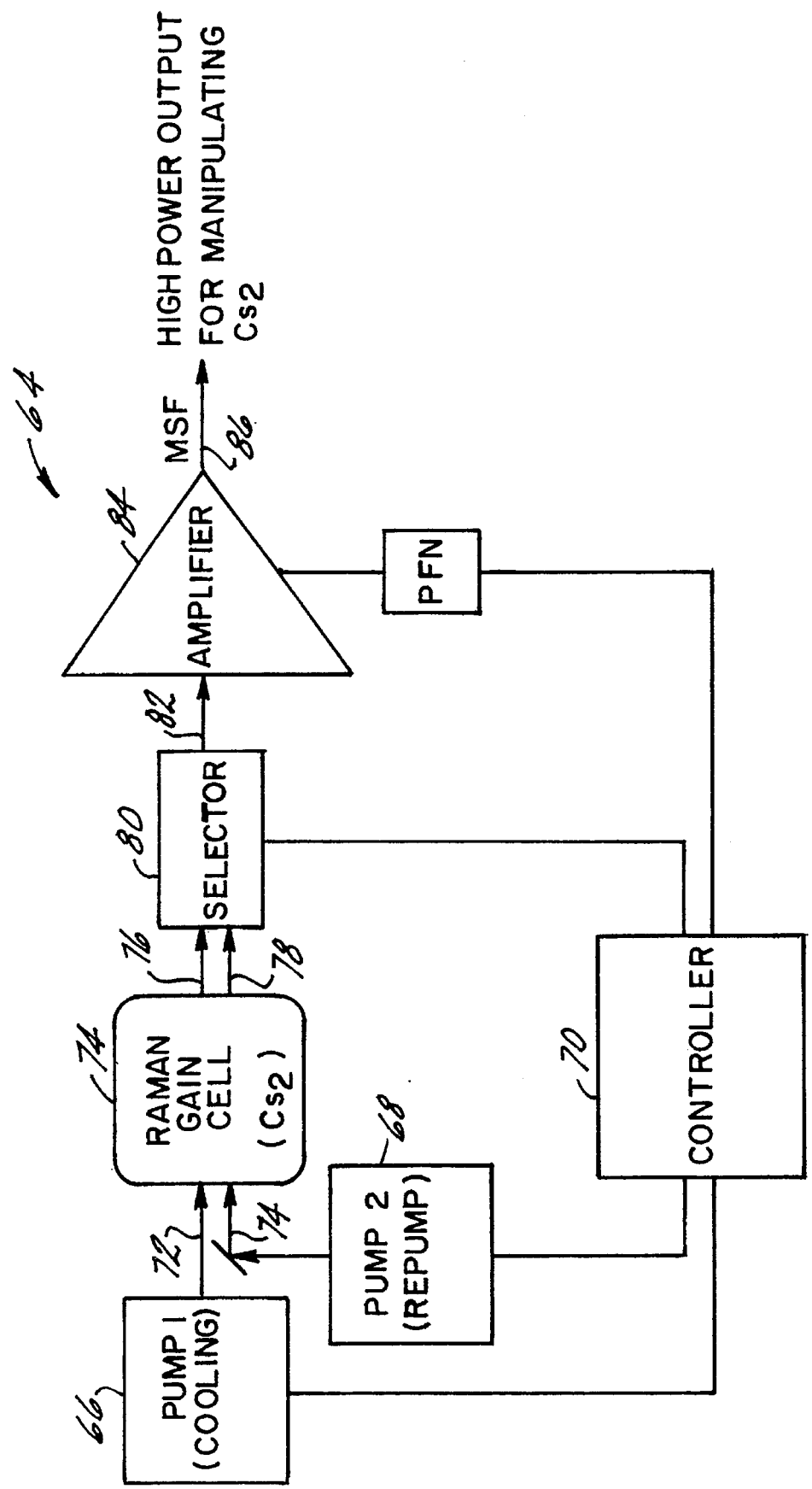
FIG. 29 is a schematic block diagram of a multiple single frequency laser employing repump in accordance with the present invention.
Figure 30:
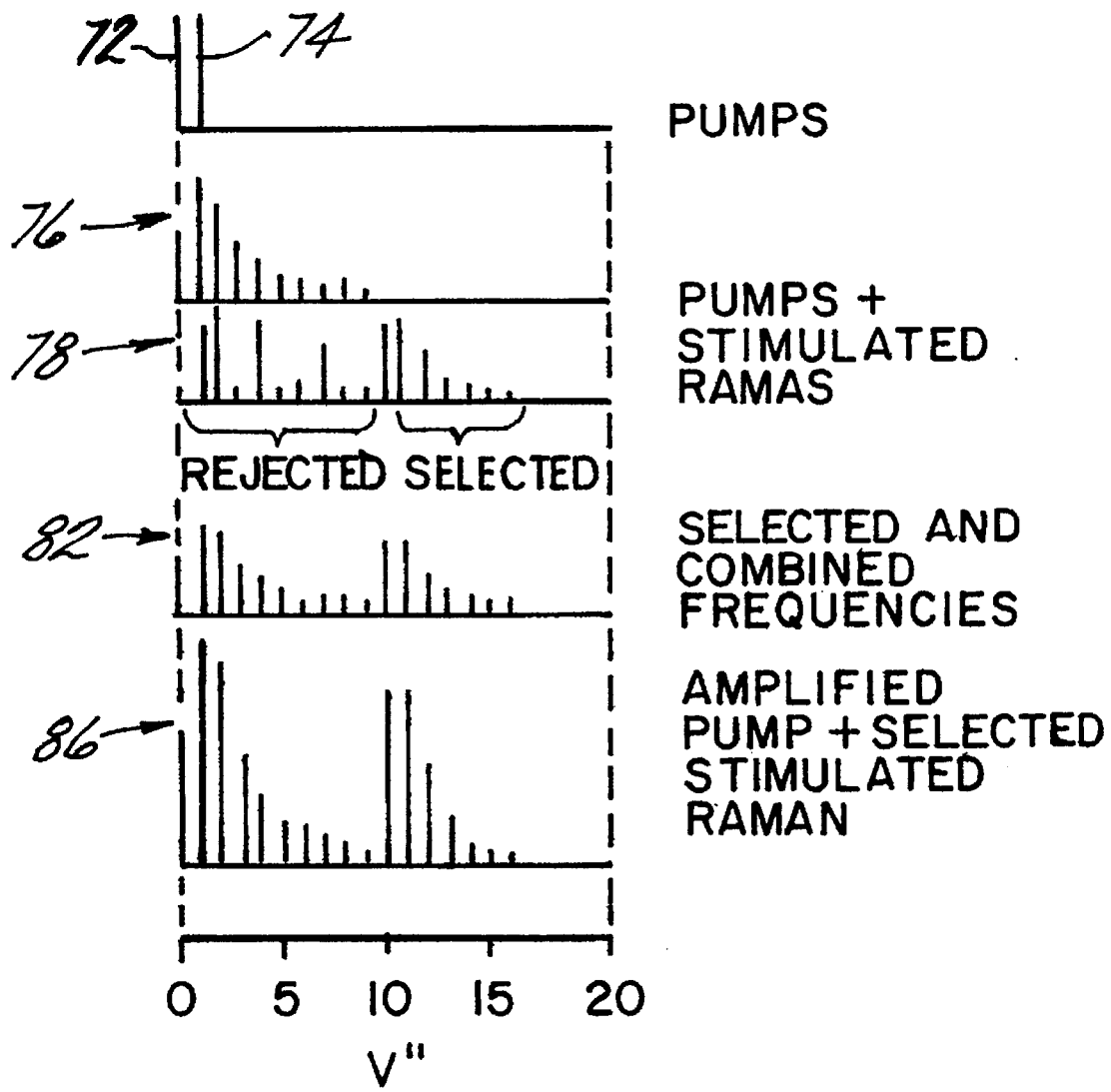
FIG. 30 is a plurality spectral output plots for the outputs of the multiple single frequency laser of FIG. 29 for cooling Cesium dimers.

Referring to FIGS. 29 and 30, a MSF laser 64 comprises two single mode CW pump lasers 66 and 68, which are synchronized by a controller 70 which also tunes and chirps the pump frequencies 72 and 74, respectively for performing RE and TE cooling. Pump and repump laser beams 72 and 74, respectively, excite coherent (two-photon) stimulated Raman transitions in $Cs_2$ molecules contained in a multipass Raman gain cell 74 producing outputs 76 and 78, respectively. A selector 80 which functions like a filter, is used to remove unwanted repump frequencies from outputs 78 and 76 and combine the residual output with the filtered output to give a selected output 82. Output 82, containing all frequencies needed for a closed cooling cycle, is then amplified (e.g., ×10$^6$) by a broad band pulsed Alexandrite amplifier 84 to give a long (e.g., 12 ms) pulse output 86 of transition saturating frequencies for closed cycle cooling.

Pump lasers 66 and 68 need to be single mode, and capable of coarse tuning (e.g. P chirp for RE cooling) and fine tuning or chirp (e.g., for TE cooling). Normal achievable bandwidth and chirping capabilities of available semiconductor and dye lasers are given in TABLE 6 below. Semiconductor lasers are presently available for complete coverage of the cesium dimer B–X bands and for the A–X and B–X bands of potassium and rubidium dimers, as shown in TABLE 7 below, which also includes MOPA's (Master Oscillator Power Amplifier), Alexandrite, Titanium Sapphire, and dye media.

TABLE 6

| Laser, Make, Model | Band Width MHz | Maximum Chirp Rate GHZ/ms (range) | Power mW |
|---|---|---|---|
| v-Focus, 6124 (semicond) | 0.1 | 1.2 (<60 Ghz) 0.17 (<15 nm) | 5 |
| Hitachi HLP, 1400 (semicond) | 35 | 15,000 | 15 |
| EOSI, 2001 (semicond) | 0.1 | 600 (0.6 Ghz) 300 (200–600 Ghz) | 10 |
| Coherent, 899-29 (dye) | 1 | 0.24 (<30 Ghz) | 1,000 |

TABLE 7

| Molecule | Diode | MOPA | Alexandrite | TiSapphire | Dye* (410–900 nm) |
|---|---|---|---|---|---|
| $^7Li_2$ |  |  |  | A | (A)B |
| $^{23}Na_2$ |  |  |  | (A) | AB |
| $^{39}K_2$ | AB | A |  | A | (A)B |
| $^{85}Rb_2$ | AB | A |  | (A) | B |
| $^{133}Cs_2$ | B | B | B | B | B | where A = complete coverage of A–X, bands B = complete coverage of B–X bands and ( ) = partial coverage.

Raman gain cell 74 operates similar to ring optically pumped lasers (OPL's), e.g., see, B. Wellegehausen, IEEE J. Quant. Elec. QE-15, 1108 (1979), J. T. Bahns, PH.D. Thesis, University of Iowa, 1983 which is incorporated herein by reference. The critical difference being that Raman gain cell 74 is a multipass traveling wave amplifier, not a closed optical ring resonator (hence it sometimes is referred to herein as an unclosed ring resonator).

It is important to note that because the narrow band pump lasers excite a Doppler subgroup of molecules, all of the frequencies generated are subDoppler, with approximately the same bandwidth as the pump lasers, and are controlled entirely by the controlling the frequency of the pump lasers. The detuning (from line center) of each stimulated Raman transition (δs) is related to the pump laser detuning (δp) by, $$\delta s = (k_s/k_p)\delta p, \qquad (18)$$

where $k_s$ and $k_p$ are the respective wavevectors. The forward stimulated Raman gain dominates that due to population inversion usually by a factor of 10 to 1000; hence no population inversion is required. Furthermore, the pump laser frequency and each of the stimulated Raman frequencies simultaneously interact with the same velocity subgroup of the molecules; independently of v" and J". This synchronization is necessary and sufficient for efficient TE and RE cooling.

Selector 80 filters out unwanted frequencies generated by Raman gain cell 74. Selector 80 rejects frequencies generated by the pump laser 66 in output 76 (or the repump laser 68 in output 78), that optically couple v"=0–9, to give the complete set of closed cycle MSF frequencies at output 82. Another function of selector 80 is to block selected frequencies as needed for VE cooling.

Figure 32:
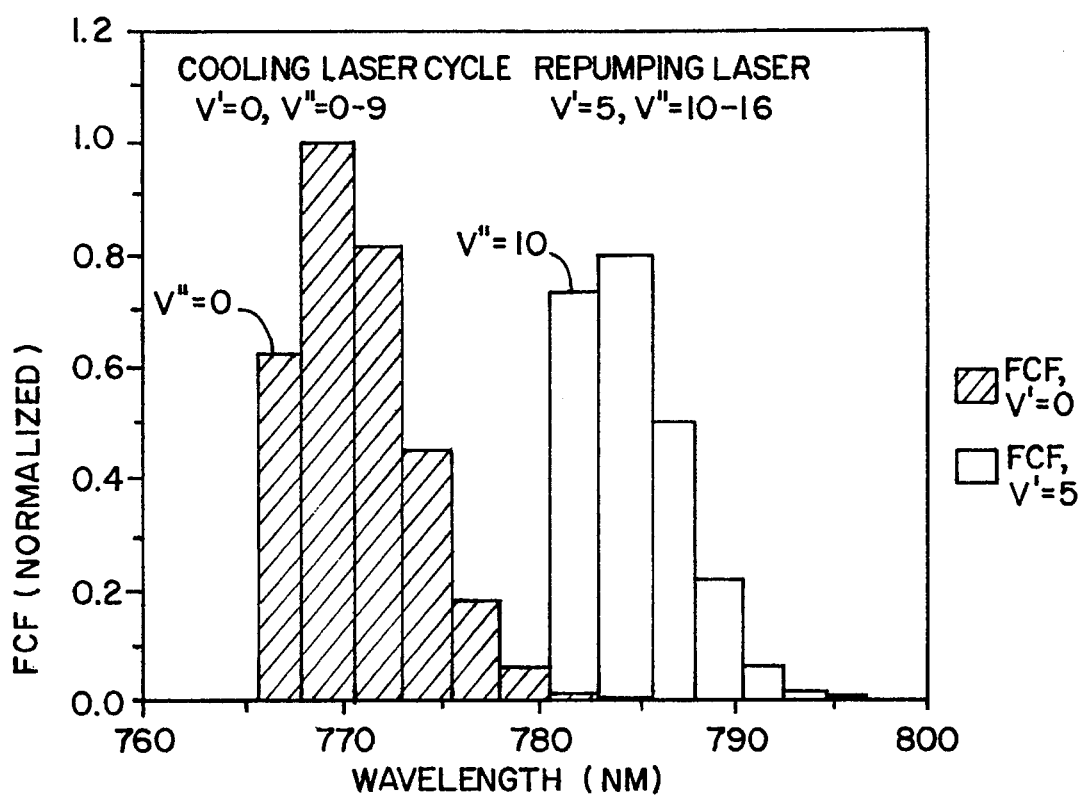
FIG. 32 is a plot of FCF versus wavelength for the MSF laser output for cooling and repumping cesium dimers on the B–X bands.

Each of the frequencies from output 82 are amplified by injection seeding a high gain (e.g., 10$^5$–10$^7$), Alexandrite, multipass traveling wave amplifier 84 (based on the Herriott design). TABLE 8, below, lists the number of passes and overall gain of similarly designed high gain amplifiers. Long pulse diode-pumped, broad band gain media such as Alexandrite, Titanium Sapphire, semiconductors, or dyes with durations in the 10$^{-6}$–10$^{-4}$ second range are sufficient for VE and RE cooling. Because longer pulse durations, in the range 10$^{-3}$–10$^2$ second, are required for TE cooling, Alexandrite is the preferred broad band gain material. This is due mainly to the long radiative lifetime (e.g., 160 microseconds) of Alexandrite which has a high energy density storage in the upper laser level, enabling long pulses (e.g., in excess of 15 ms). Amplifier 84 is, for example, a flashlamp-pumped Alexandrite laser, commercially available from Light Age Inc., that successfully delivers 7 ms, 300 J pulses. See generally, H. Plaessmann, S. A. Re', J. J. Alonis, D. L. Vecht, and W. M. Grossman, Opt. Lett. 18, 1420 (1993); C. E. Hamilton, Opt. Let. 17, 728 (1992); P. Georges, F. Estable, F. Salin, J. P. Poizat, P. Grangier, and A. Brun, Opt. Lett. 16, 144 (1991); M. Lai, J. C. Diels, and C. Yan, Appl. Opt. 30, 4365 (1991) and T. J. Kane, W. J. Kozlovsky, and R. L. Byer, Opt. Lett. 11, 216 (1986), all of the above are incorporated herein by reference.

wavelengths for the MSF laser are given in the rightmost two columns of TABLE 9. Referring to FIG. 32, these wavelengths are sufficient for the complete closed cycle manipulation of $Cs_2$.

TABLE 9

| $v''$ | Cool | | Repump | | MSF Output | |
|---|---|---|---|---|---|---|
| | FCF, $v' = 0$ | Trans (nm) | FCF, $v' = 5$ | Trans (nm) | FCF | Trans (nm) |
| | | | | | COOL: | |
| 0 | 0.625 | 766.88 | 0.093 | 757.045 | 0.625 | 766.88 |
| 1 | 1 | 769.35 | 0.79 | 759.452 | 1 | 769.35 |
| 2 | 0.823 | 771.82 | 1 | 761.864 | 0.823 | 771.82 |
| 3 | 0.458 | 774.31 | 0.006 | 764.282 | 0.458 | 774.31 |
| 4 | 0.191 | 776.79 | 0.673 | 766.706 | 0.191 | 776.79 |
| 5 | 0.063 | 779.29 | 0.086 | 769.136 | 0.063 | 779.29 |
| 6 | 0.017 | 781.79 | 0.333 | 771.571 | 0.017 | 781.79 |
| 7 | 0.003 | 784.29 | 0.556 | 774.012 | 0.003 | 784.29 |
| 8 | 0.001 | 786.81 | 0.043 | 776.458 | 0.001 | 786.81 |
| 9 | 0.0001 | 789.32 | 0.222 | 778.911 | 0 | 789.32 |
| | | | 62% | | REPUMP: | |
| 10 | | | 0.741 | 781.368 | 0.741 | 781.368 |
| 11 | | | 0.802 | 783.831 | 0.802 | 783.831 |
| 12 | | | 0.506 | 786.300 | 0.506 | 786.300 |
| 13 | | | 0.222 | 788.774 | 0.222 | 788.774 |
| 14 | | | 0.074 | 791.253 | 0.074 | 791.253 |
| 15 | | | 0.019 | 793.738 | 0.019 | 793.738 |
| 16 | | | 0.006 | 796.228 | 0.006 | 796.228 |
| | | | 38% | | | |

TABLE 8

| Amplifier | Pump | # of Passes | Gain | Ref. |
|---|---|---|---|---|
| ND:YAG | Flash-lamp | <11 | $10^6$ | ZHA 94 |
| ND:YAG | Diode Laser | <14 | $6 \times 10^5$ @ 1060 | PLA 93 |
| TiSapphire Ring | ND;YAG X2 | — | 40% eff. | HAM 92 |
| TiSapphire Linear | ND;YAG X2 | 6 | $2 \times 10^6$ @ 780 nm | GEO 91 |
| DYE-Kiton Red | Copper Vapor Laser | 11 | $10^5$ @ 620 nm | LAI 91 |
| ND:YAG | Flash-lamp | 4 | $8 \times 10^7$ | KAN 86 |

Figure 31:
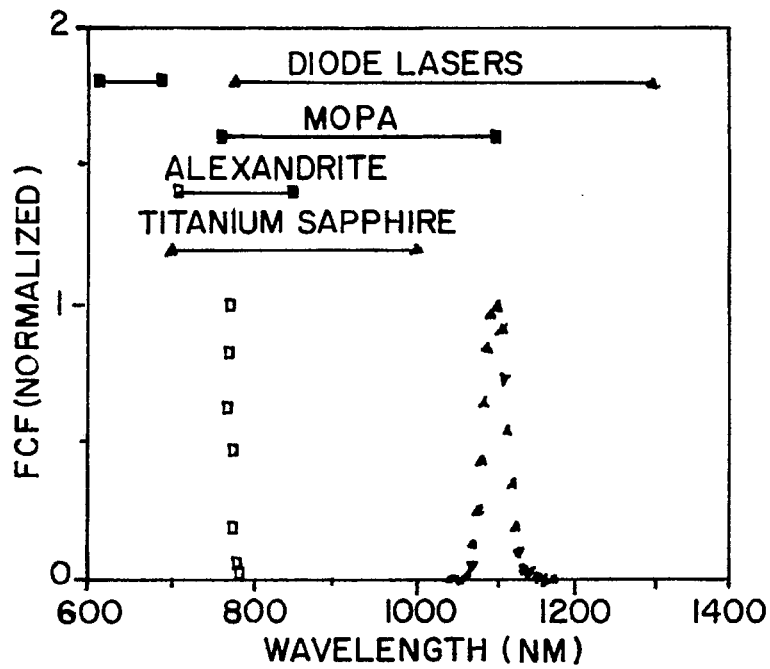
FIG. 31 is a plot of FCF versus wavelength for $Cs_2$, B–X and A–X bands and tunable solid state lasers.

Referring to FIG. 31, Diode, MOPA, Alexandrite, and Titanium Sapphire gain media completely span the B–X ($v'=0 \rightarrow v''$) bands of cesium dimers are shown. Further, TABLE 9 below lists $v''$ transition probabilities, normalized to the largest FCF, and wavelengths for the cooling and repump lasers. The cooling pump laser 66, operated at 766.880 nm, pumps the $v''=0 \rightarrow v'=0$ vibrational band, generating wavelengths spanning $v''=0–9$. The repump laser 68, operated at 759.452 nm, pumps the $v'=1 \rightarrow v'=5$ band generating wavelengths spanning $v'=0–16$. Once repumped to $v'=5$, there is a 62% probability of unidirectional radiative decay to one of the cooling levels ($v'=0–9$) (see, TABLE 9). Only repump wavelengths spanning $v'=10–16$ are transmitted by the selector. The resultant transition probabilities and wavelengths for the MSF laser are given in the rightmost two columns of TABLE 9.

Figure 33:
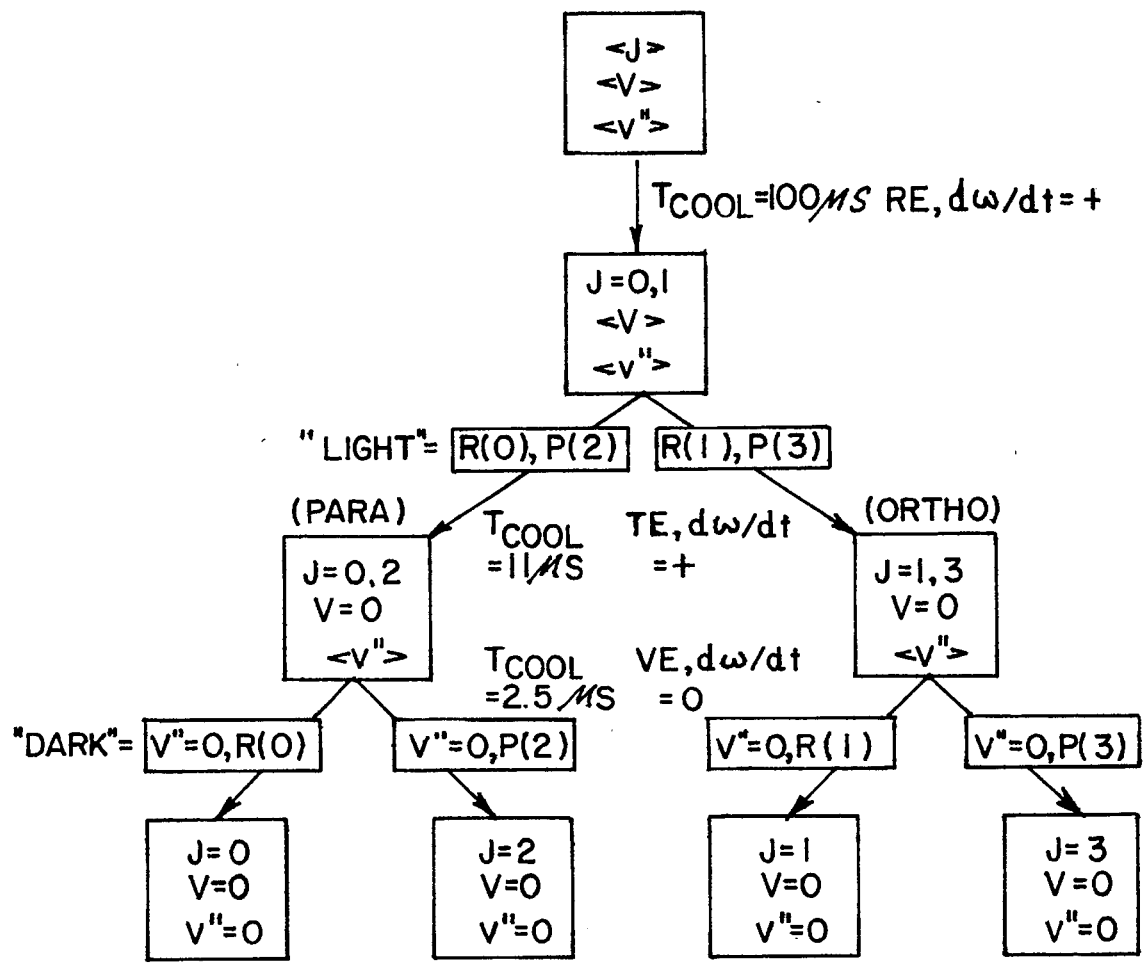
FIG. 33 is a flow chart for RE, TE and VE cooling of $Cs_2$ alkali dimers.

Referring to FIG. 33, a flowchart for producing $v''=0$, $J''=0, 1, 2$ or 3 $Cs_2$ ($I=3/2$) molecules is shown. After the initial RE P-chirp terminating on P(2) only J=0 and 1 states remain populated. TE cooling is then performed on either the R(0), P(2) or the R(1), P(3) transitions in order to select para or ortho molecules respectively. VE cooling selects the final dark $v'',J''$ state.

It will be appreciated that other variations are possible and will be readily apparent to one skilled in the art, e.g., variations that utilize other techniques besides the optical pumping with the Raman effect (such as, electron beams or discharges in molecules) to produce multiline outputs followed with wavelength selection (e.g., discharge pumped lasers such as the hydrogen laser, nitrogen laser, carbon dioxide laser).

The present invention is may find application in the areas of beamed energy transport, remote cooling, micro-surface cooling, optical sensing, and optical fiber communications (i.e., wavelength division multiplexing). Remotely driven laser optical refrigeration/heating systems can be fast and highly efficient if driven by a MSF laser, as described herein. The present invention, as set forth herein, finds application in state-selected, polarized molecular targets for scattering experiments, chemical reaction control, photodissociation, molecular beams, photoassociative spectroscopy, photonucleation, Bose/Einstein condensation, inelastic collisions, high energy density materials, lumino-refrigeration, remote sensing, isotope separation, communications, and microcrystal growth.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A multiple single frequency laser system for manipulating at least one degree of freedom of a first sample of molecules, comprising:
   a first laser for generating a first laser beam;
   a cell adapted to contain a second, separate sample of the same species of molecules as said first sample, said cell being receptive to said first laser beam, said cell including means for interacting said first laser beam with said molecules in said cell to provide an output beam tuned to specific first optical transitions; and
   a means for interacting said output beam with said first sample of molecules to manipulate said at least one degree of freedom of said first sample of molecules.

2. The multiple single frequency laser system of claim 1 further comprising: a selector for removing unwanted frequencies in said output beam.

3. The multiple single frequency laser system of claim 2 wherein said selector comprises:
   a mask: and
   a pair of polychromators with said mask disposed therebetween.

4. The multiple single frequency laser system of claim 3 wherein said mask comprises a digital mask.

5. The multiple single frequency laser system of claim 3 wherein said mask comprises a spatial light modulator.

6. The multiple single frequency laser system of claim 2 wherein said selector comprises:
   a mask: and
   a pair of prisms with said mask disposed therebetween.

7. The multiple single frequency laser system of claim 6 wherein said mask comprises a digital mask.

8. The multiple single frequency laser system of claim 6 wherein said mask comprises a spatial light modulator.

9. The multiple single frequency laser system of claim 1 further comprising:
   an amplifier for amplifying said output beam.

10. The multiple single frequency laser system of claim 9 wherein said amplifier comprises:
    a master oscillator power amplifier; and
    a multipass Alexandrite amplifier optically aligned with said master oscillator power amplifier.

11. The multiple single frequency laser system of claim 1 further comprising:
    a controller for controlling a first frequency of said first laser.

12. The multiple single frequency laser system of claim 1 further comprising:
    a second laser for generating a second laser beam;
    said cell being receptive to said second laser beam, and wherein said means for interacting further includes interacting said second laser beam with said molecules in said cell to provide another output beam, said other output beam tuned to specific second optical transitions; and
    a means for interacting said output beam with said first sample of molecules to manipulate said at least one degree of freedom of said first sample of molecules.

13. The multiple single frequency laser system of claim 12 further comprising:
    a controller for synchronizing said first and second lasers so that said output beams from said first and second lasers comprise a single beam tuned to specific first and second optical transitions.

14. The multiple single frequency laser system of claim 1 wherein said cell comprises a Raman gain cell.

15. The multiple single frequency laser system of claim 14 wherein said Raman gain cell comprises a multipass Raman gain cell.

16. The multiple single frequency laser system of claim 15 wherein said multipass Raman gain cell comprises a multipass ring optical cavity.

17. The multiple single frequency laser system of claim 1 further comprising:
    a second repumping laser for generating a second repump laser beam; and
    said cell being receptive to said second repump laser beam, and wherein said means for interacting further includes interacting said second repump laser beam with said molecules in said cell to provide another output beam, said other output beam directed to an excited state of said first sample of molecules for emptying a dark state therein to define a closed cycle of operation.

18. The multiple single frequency laser system of claim 17 further comprising:
    a controller for synchronizing said first laser and said second repump laser so that said output beams from said first laser and second repump laser comprise a single beam of synchronized frequencies.

19. The multiple single frequency laser system of claim 18 further comprising:
    an amplifier for amplifying said beam.

20. The multiple single frequency laser system of claim 19 wherein said amplifier comprises a multipass Alexandrite amplifier.

21. The multiple single frequency laser system of claim 17 wherein said cell comprises a Raman gain cell.

22. The multiple single frequency laser system of claim 21 wherein said Raman gain cell comprises a multipass Raman gain cell.

23. The multiple single frequency laser system of claim 1 wherein said manipulation comprises one of cooling, heating, and population transfer of said first sample of molecules.

24. The multiple single frequency laser system of claim 23 wherein said cooling comprises an external degree of freedom comprising one of translation electronic (TE), translation vibration (TV) and translation rotation (TR).

25. The multiple single frequency laser system of claim 23 wherein said cooling comprises an internal degree of freedom comprising one of vibration electronic (VE), vibration vibration(VV), rotation electronic (RE), rotation vibration (RV), rotation rotation (RR) and electronic electronic (EE).

26. A method for manipulating at least one degree of freedom of a first sample of molecules, comprising the steps of:
    generating a first laser beam;
    receiving said first laser beam in a cell containing a second, separate sample of the same species of molecules as said first sample, wherein said first laser beam interacts with said molecules therein to provide an output beam tuned to specific first optical transitions; and
    manipulating said at least one degree of freedom of said first sample of molecules with said output beam.

27. The method of claim 26 further comprising the step of:
    removing unwanted frequencies in said output beam.

28. The method of claim 26 further comprising the step of:
amplifying said output beam.

29. The method of claim 26 further comprising the step of:
controlling a first frequency of said first laser.

30. The method of claim 26 further comprising the step of:
generating a second laser beam;
receiving said second laser beam in said cell, wherein said second laser beam interacts with said molecules therein to provide another output beam, said other output beam tuned to specific second optical transitions; and
manipulating said at least one other degree of freedom of said first sample of molecules with said other output beam.

31. The method of claim 30 further comprising the step of:
synchronizing said first and second laser beams to produce a single beam tuned to specific first and second optical transitions.

32. The method of claim 26 wherein said cell comprises a Raman gain cell.

33. The method of claim 32 wherein said Raman gain cell comprises a multipass Raman gain cell.

34. The method of claim 33 wherein said multipass Raman gain cell comprises a multipass ring optical cavity.

35. The method of claim 26 further comprising the steps of:
generating a second repump laser beam;
receiving said second repump laser beam in said cell, wherein said second repump laser beam interacts with said molecules therein to provide another output beam, said other output beam directed to an excited state of said first sample of molecules; and
emptying a dark state in said first sample of molecules to define a closed cycle of operation.

36. The method of claim 35 further comprising the step of:
synchronizing said first laser beam and second repump laser beam to produce a single beam of synchronized frequencies.

37. The method of claim 36 further comprising the step of:
amplifying said beam.

38. The method of claim 35 wherein said cell comprises a Raman gain cell.

39. The method of claim 38 wherein said Raman gain cell comprises a multipass Raman gain cell.

40. The method of claim 26 wherein said manipulation comprises one of cooling, heating, and population transfer of said first sample of molecules.

41. The method of claim 40 wherein said cooling comprises an external degree of freedom comprising one of translation electronic (TE), translation vibration (TV) and translation rotation (TR).

42. The method of claim 40 wherein said cooling comprises an internal degree of freedom comprising one of vibration electronic (VE), vibration vibration(VV), rotation electronic (RE), rotation vibration (RV), rotation rotation (RR) and electronic electronic (EE).

* * * * *

UNITED STATES PATENT AND TRADEMARK OFFICE
CERTIFICATE OF CORRECTION

PATENT NO. : 5,620,571
DATED : April 15, 1997
INVENTOR(S) : John T. Bahns et al

It is certified that error appears in the above-identified patent and that said Letters Patent are hereby corrected as shown below:

Column 7, Line 2, In column labeled "Optical Transition" delete "$^1\Pi_u{-}^1\Sigma_g{-}$" (3$^{rd}$ occurrence) and insert therefor --$^1\Sigma_u{-}^1\Sigma_g{+}$--
Column 14, Line 52, Delete (J '5) and insert therefor --(J"5)--
Column 15, Line 27, Delete "J '= 1" and insert therefor --(J"5)--
Column 16, Line 67 Delete "$10^{-3}$-$10^{2}$" and insert therefor --$10^{-3}$-$10^{-2}$--
Column 17, Line 62, Delete "v '" and insert therefor --v"--
Column 17, line 65, Delete "v '" and insert therefor --v"--
Column 17, line 66, Delete "v '" and insert therefor --v"--
Column 19, Line 12, Delete "a"
Column 19, Line 59, Delete "a"
Column 20, Line 30, After "said" insert --output--

Signed and Sealed this

Twenty-ninth Day of May, 2001

*Attest:*

NICHOLAS P. GODICI

*Attesting Officer*     *Acting Director of the United States Patent and Trademark Office*